United States Patent
Kita et al.

(10) Patent No.: US 9,741,174 B2
(45) Date of Patent: Aug. 22, 2017

(54) INFORMATION PROCESSING APPARATUS, INFORMATION PROCESSING METHOD, AND COMPUTER-READABLE RECORDING MEDIUM

(71) Applicants: Atsushi Kita, Kanagawa (JP); Akira Takayama, Tokyo (JP); Daisuke Yamamoto, Tokyo (JP)

(72) Inventors: Atsushi Kita, Kanagawa (JP); Akira Takayama, Tokyo (JP); Daisuke Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/970,093

(22) Filed: Dec. 15, 2015

(65) Prior Publication Data
US 2016/0203644 A1    Jul. 14, 2016

(30) Foreign Application Priority Data

Jan. 14, 2015  (JP) ................. 2015-005364
Oct. 7, 2015  (JP) ................. 2015-199712

(51) Int. Cl.
G06T 11/60    (2006.01)
G06T 19/00    (2011.01)
G06T 19/20    (2011.01)
H04N 1/00    (2006.01)
H04N 5/225    (2006.01)

(52) U.S. Cl.
CPC ............ *G06T 19/006* (2013.01); *G06T 11/60* (2013.01); *G06T 19/20* (2013.01);
(Continued)

(58) Field of Classification Search
CPC ....... G06T 11/60; G06T 19/006; G06T 19/20; G06T 2200/24; G06T 2219/2004;
(Continued)

(56) References Cited

U.S. PATENT DOCUMENTS

2012/0063801 A1* 3/2012 Higashi ............. G03G 15/5016
                                                              399/81
2012/0259744 A1* 10/2012 Ganesh .................. G06Q 30/00
                                                              705/27.2
(Continued)

FOREIGN PATENT DOCUMENTS

JP           4032776        11/2007
JP         2014-010722       1/2014

OTHER PUBLICATIONS

European search report dated Jul. 11, 2016 in corresponding European Patent Application No. 15199902.6.
(Continued)

*Primary Examiner* — Ke Xiao
*Assistant Examiner* — Jed-Justin Imperial
(74) *Attorney, Agent, or Firm* — Cooper & Dunham LLP

(57) ABSTRACT

An information processing apparatus according to an embodiment includes an imaging unit that obtains a captured image including position identification information identifying a position in which a virtual object represented by an image including an immovable part and a movable part is to be displayed; a generator that generates a composite image obtained by combining the virtual object with the captured image in the position thereof identified by the position identification information; a display unit that displays thereon the composite image; an operation receiver that receives an operation on the movable part included in the composite image displayed on the display unit; and a display controller that controls the display of the movable part, based on display setting information for displaying the virtual object, when the operation receiver has received the operation on the movable part.

15 Claims, 34 Drawing Sheets

(52) U.S. Cl.
CPC ......... *H04N 1/00411* (2013.01); *H04N 5/225* (2013.01); *G06T 2200/24* (2013.01); *G06T 2219/2004* (2013.01); *G06T 2219/2016* (2013.01); *G06T 2219/2021* (2013.01)

(58) Field of Classification Search
CPC .... G06T 2219/2016; G06T 2219/2021; H04N 1/00411; H04N 5/225
See application file for complete search history.

(56) References Cited

U.S. PATENT DOCUMENTS

| | | |
|---|---|---|
| 2014/0006435 A1 | 1/2014 | Kishi et al. |
| 2014/0285522 A1* | 9/2014 | Kim .................. G06T 19/006 345/633 |
| 2015/0077582 A1* | 3/2015 | Zhang ................ H04N 5/23229 348/222.1 |

OTHER PUBLICATIONS

J. W. S. Chong, S. K. Ong and A. Y. C. Neel: "Methodologies for Immersive Robot Programming in an Augmented Reality Environment", Int'l J. of Virtual Reality, 2007, pp. 6(1):69-79.

Gausemeier J et al: "AR-based configuration and information retrieval of household appliances on mobile devices", Proceeding of Chinz 2003, pp. 93-98.

Harasaki S et al: "Vision-based overlay of a virtual object into real scene for designing room interior", Proc. SPIE, vol. 4572, 200, pp. 545-555.

\* cited by examiner

| MODEL NAME | MAIN UNIT | BANK | FINISHER |
|---|---|---|---|
| PRINTER A | MAIN UNIT IMAGE A | NO | NO |
| PRINTER B | MAIN UNIT IMAGE B | NO | NO |
| ⋮ | ⋮ | ⋮ | ⋮ |

FIG.6

| MODEL NAME | BANK | DISPLAY REFERENCE POINT | MAXIMUM NUMBER OF BANKS |
|---|---|---|---|
| PRINTER A | BANK IMAGE A | (x_a6, y_a6, z_a6) | 1 |
| PRINTER B | BANK IMAGE B | (x_b6, y_b6, z_b6) | 3 |
| ⋮ | ⋮ | ⋮ | ⋮ |

FIG.7

| MODEL NAME | FINISHER | DISPLAY REFERENCE POINT |
|---|---|---|
| PRINTER A | FINISHER IMAGE A | (x_a7, y_a7, z_a7) |
| PRINTER B | FINISHER IMAGE B | (x_b7, y_b7, z_b7) |
| ⋮ | ⋮ | ⋮ |

FIG.8

| MODEL NAME | ADF | | DISPLAY REFERENCE POINT |
|---|---|---|---|
| | OPEN | CLOSE | |
| PRINTER A | ADF_OPEN IMAGE A | ADF_CLOSE IMAGE A | (x_a1, y_a1, z_a1) |
| PRINTER B | - | - | - |
| ⋮ | ⋮ | ⋮ | ⋮ |

FIG.9

| MODEL NAME | TONER COVER | | DISPLAY REFERENCE POINT |
|---|---|---|---|
| | OPEN | CLOSE | |
| PRINTER A | TONER_OPEN IMAGE A | TONER_CLOSE IMAGE A | (x_a2, y_a2, z_a2) |
| PRINTER B | TONER_OPEN IMAGE B | TONER_CLOSE IMAGE B | (x_b2, y_b2, z_b2) |
| ⋮ | ⋮ | ⋮ | ⋮ |

FIG.10

| MODEL NAME | PAPER TRAY | | DISPLAY REFERENCE POINT |
|---|---|---|---|
| | OPEN | CLOSE | |
| PRINTER A | TRAY_OPEN IMAGE A | TRAY_CLOSE IMAGE A | $(x\_a3, y\_a3, z\_a3)$ |
| PRINTER B | TRAY_OPEN IMAGE B | TRAY_CLOSE IMAGE B | $(x\_b3, y\_b3, z\_b3)$ |
| ⋮ | ⋮ | ⋮ | ⋮ |

FIG.11

| MODEL NAME | DUPLEX UNIT COVER | | DISPLAY REFERENCE POINT |
|---|---|---|---|
| | OPEN | CLOSE | |
| PRINTER A | COVER_OPEN IMAGE A | COVER_CLOSE IMAGE A | $(x\_a4, y\_a4, z\_a4)$ |
| PRINTER B | COVER_OPEN IMAGE B | COVER_CLOSE IMAGE B | $(x\_b4, y\_b4, z\_b4)$ |
| ⋮ | ⋮ | ⋮ | ⋮ |

FIG.12

| MODEL NAME | PRINT OPERATION | DISPLAY REFERENCE POINT |
|---|---|---|
| PRINTER A | PRINT IMAGE A | (x_a5, y_a5, z_a5) |
| PRINTER B | PRINT IMAGE B | (x_b5, y_b5, z_b5) |
| ⋮ | ⋮ | ⋮ |

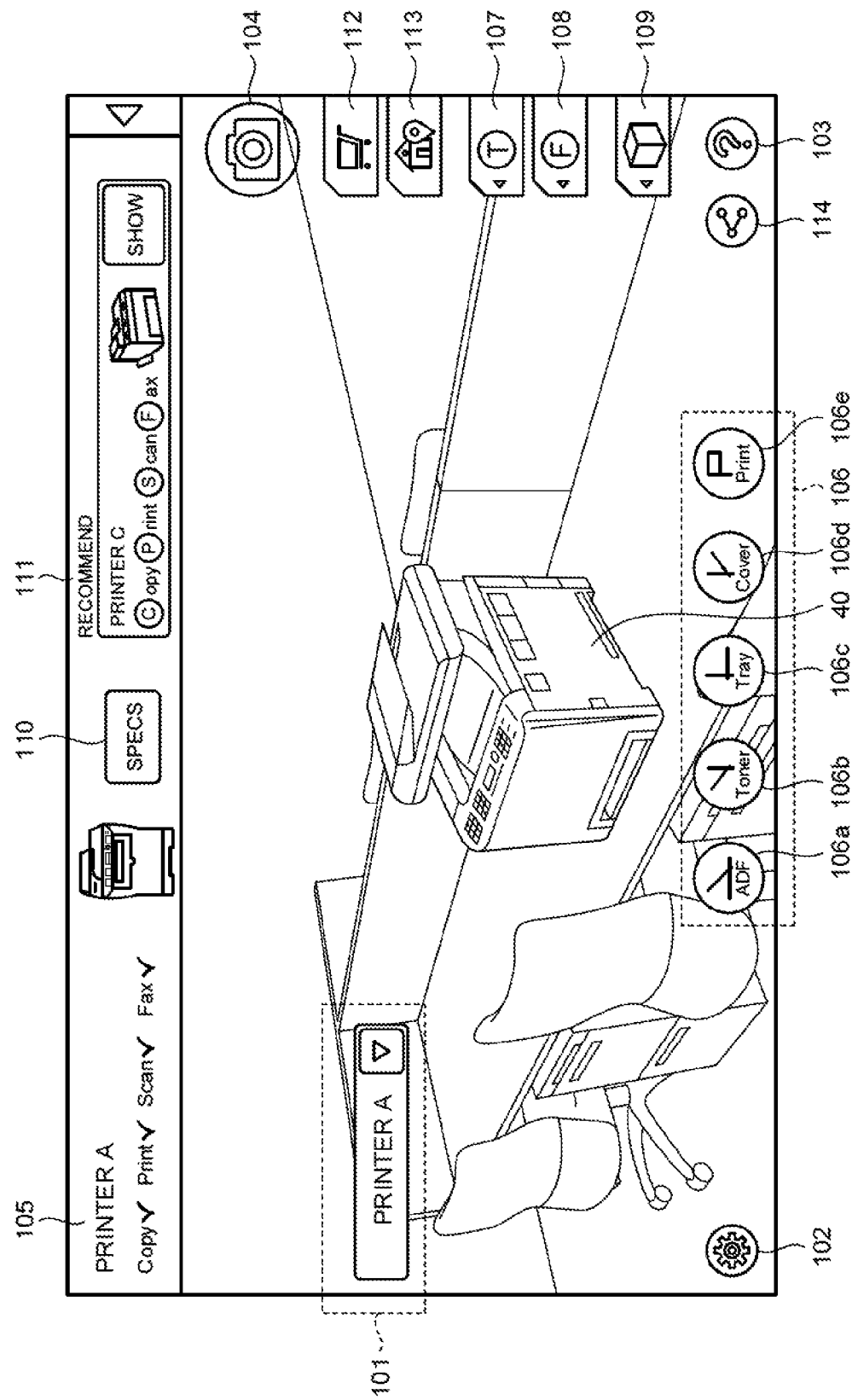

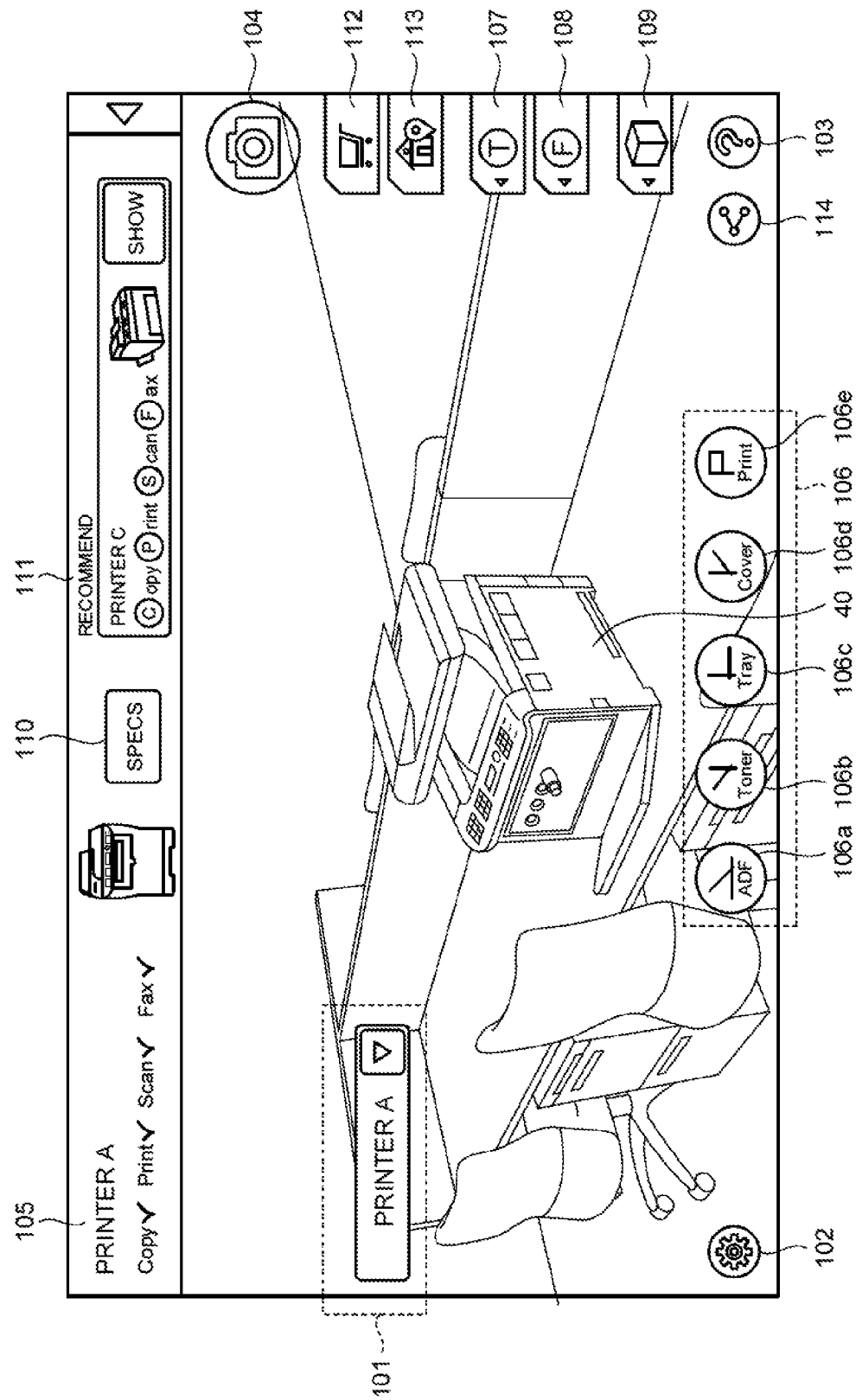

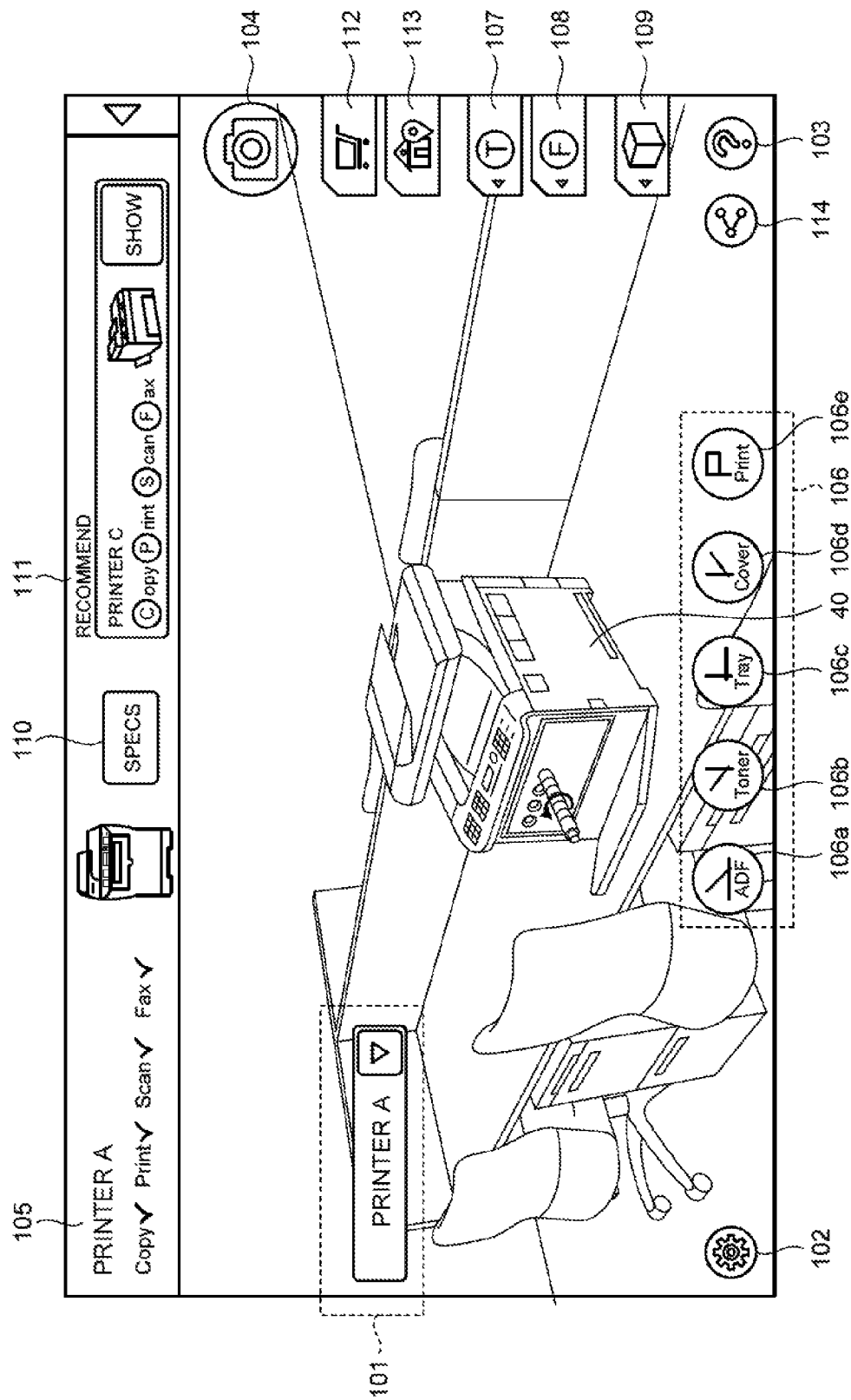

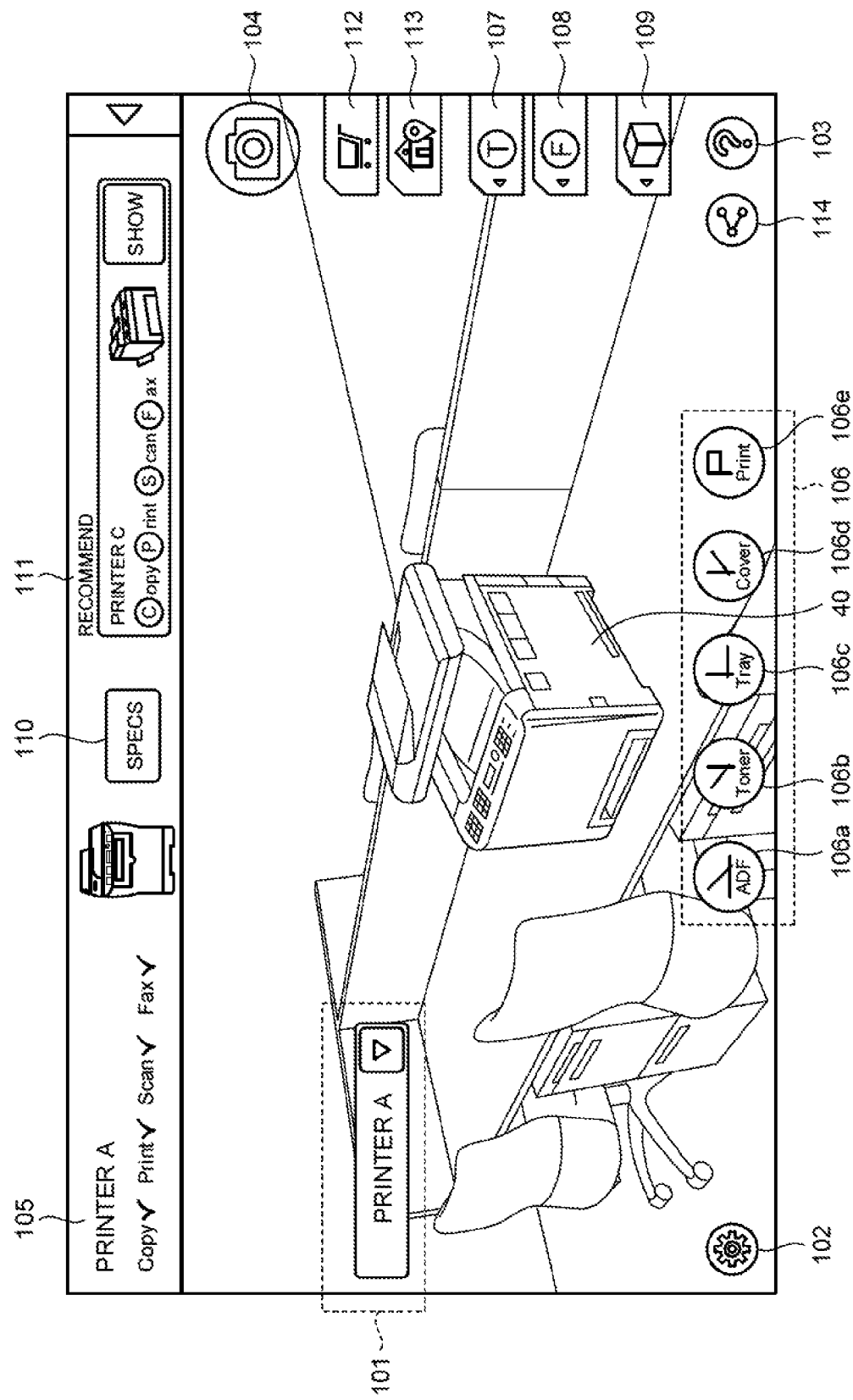

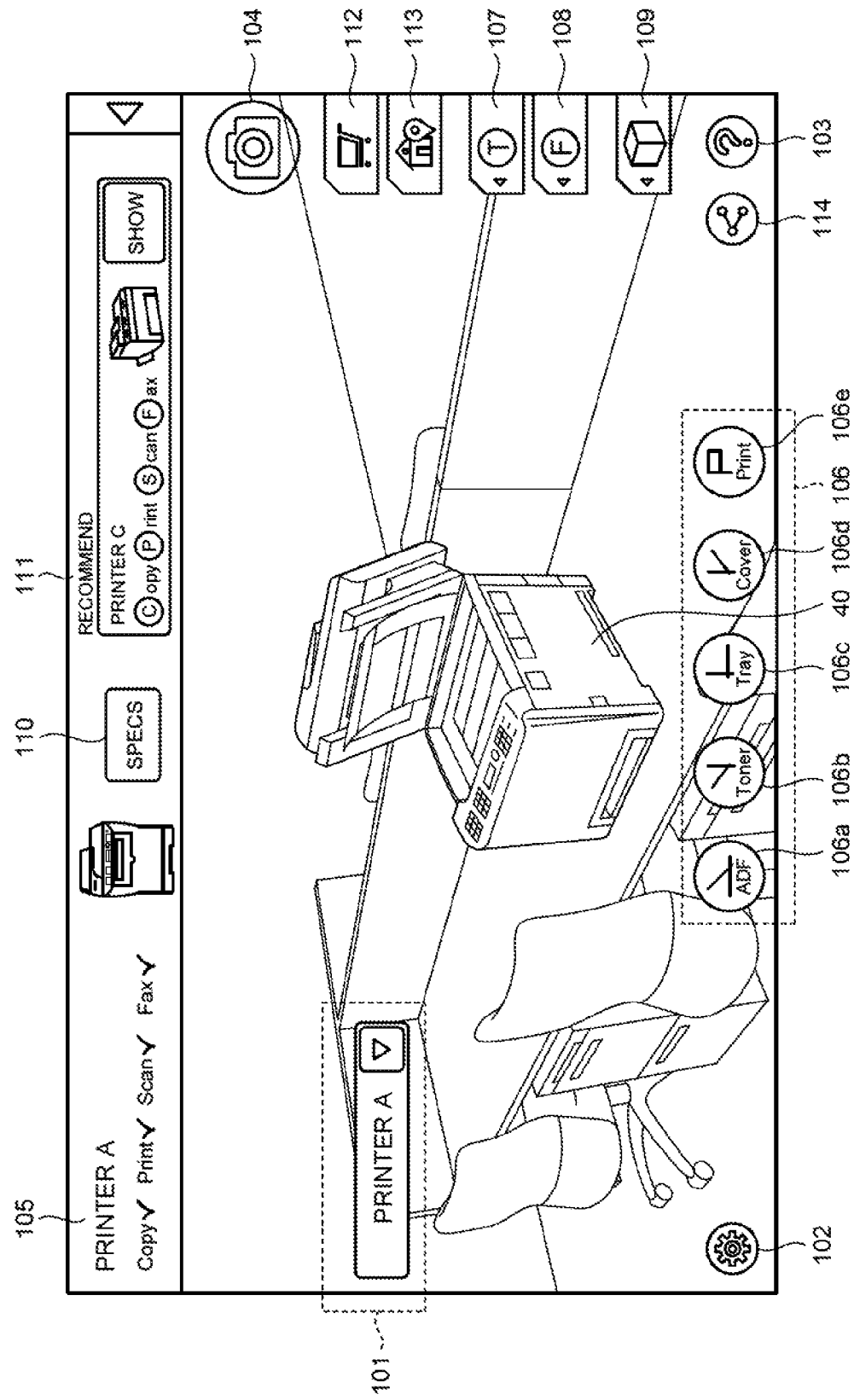

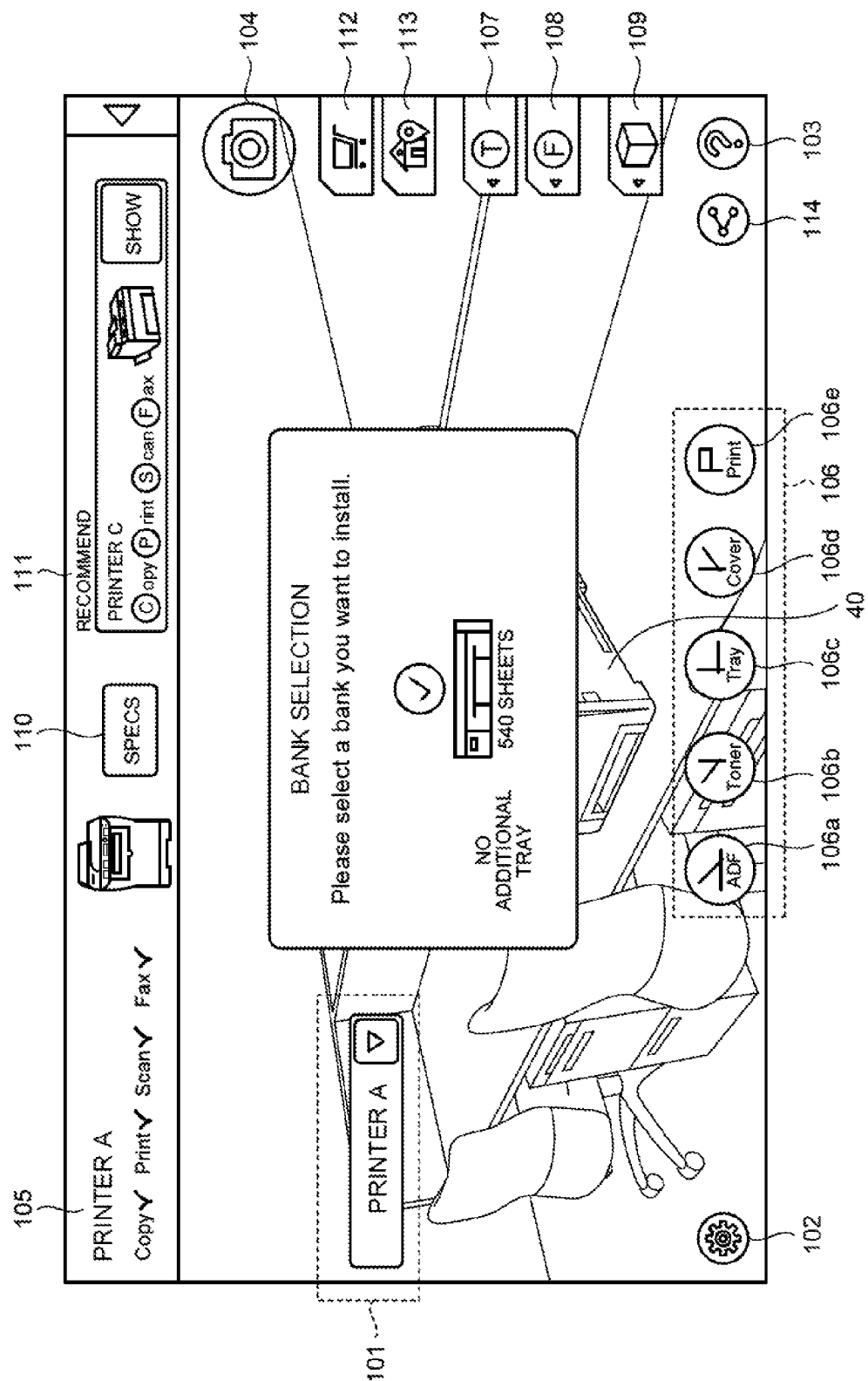

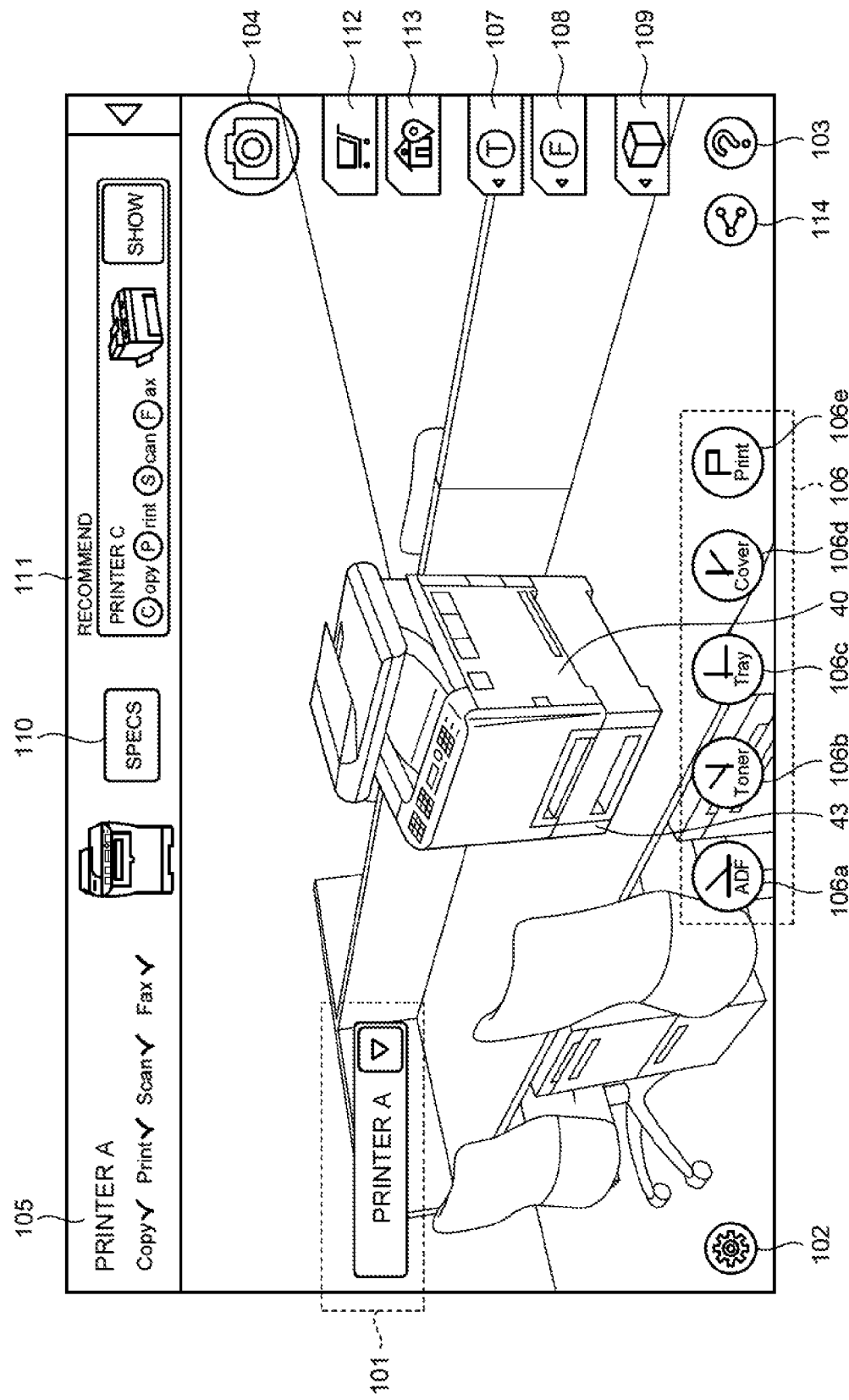

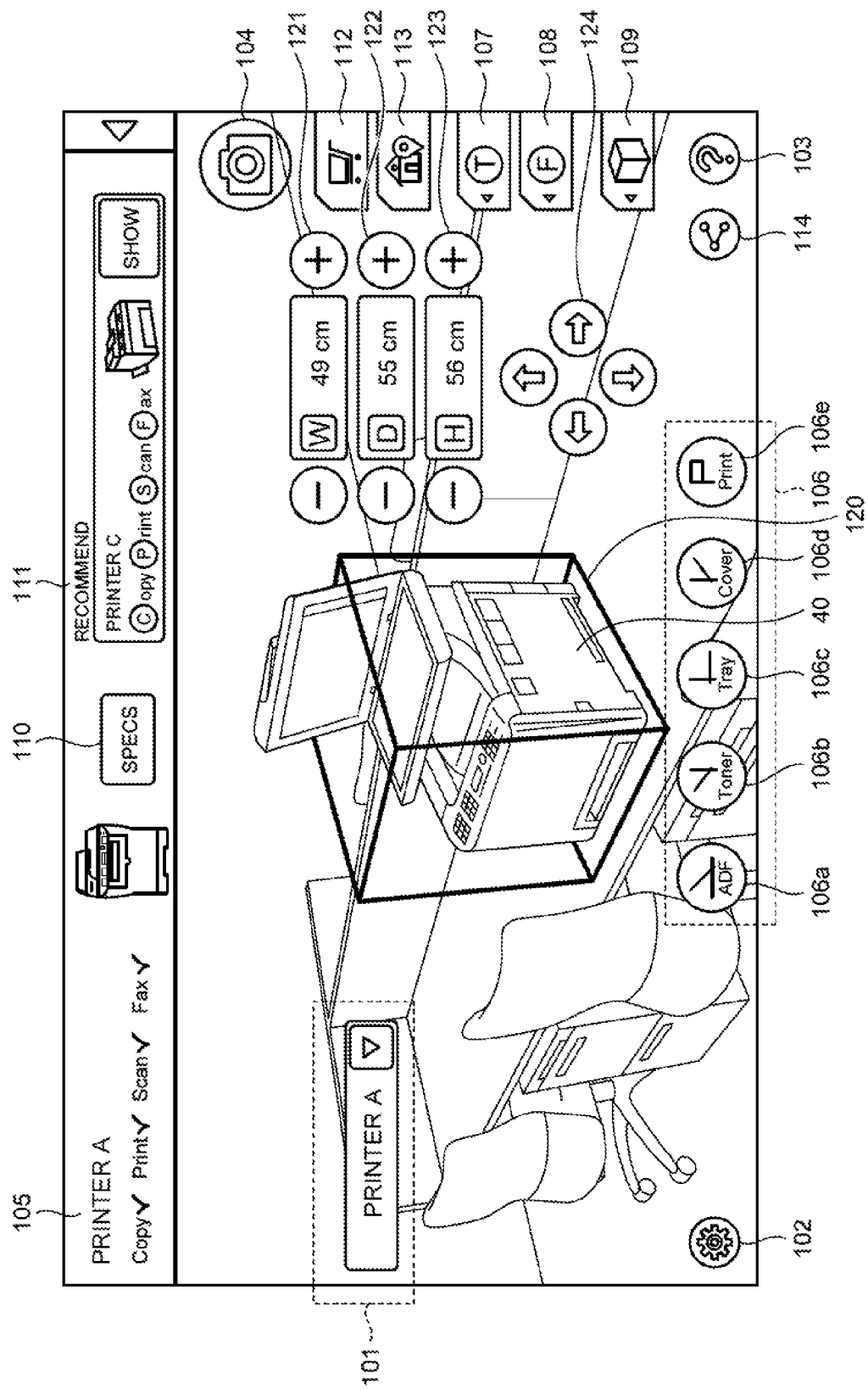

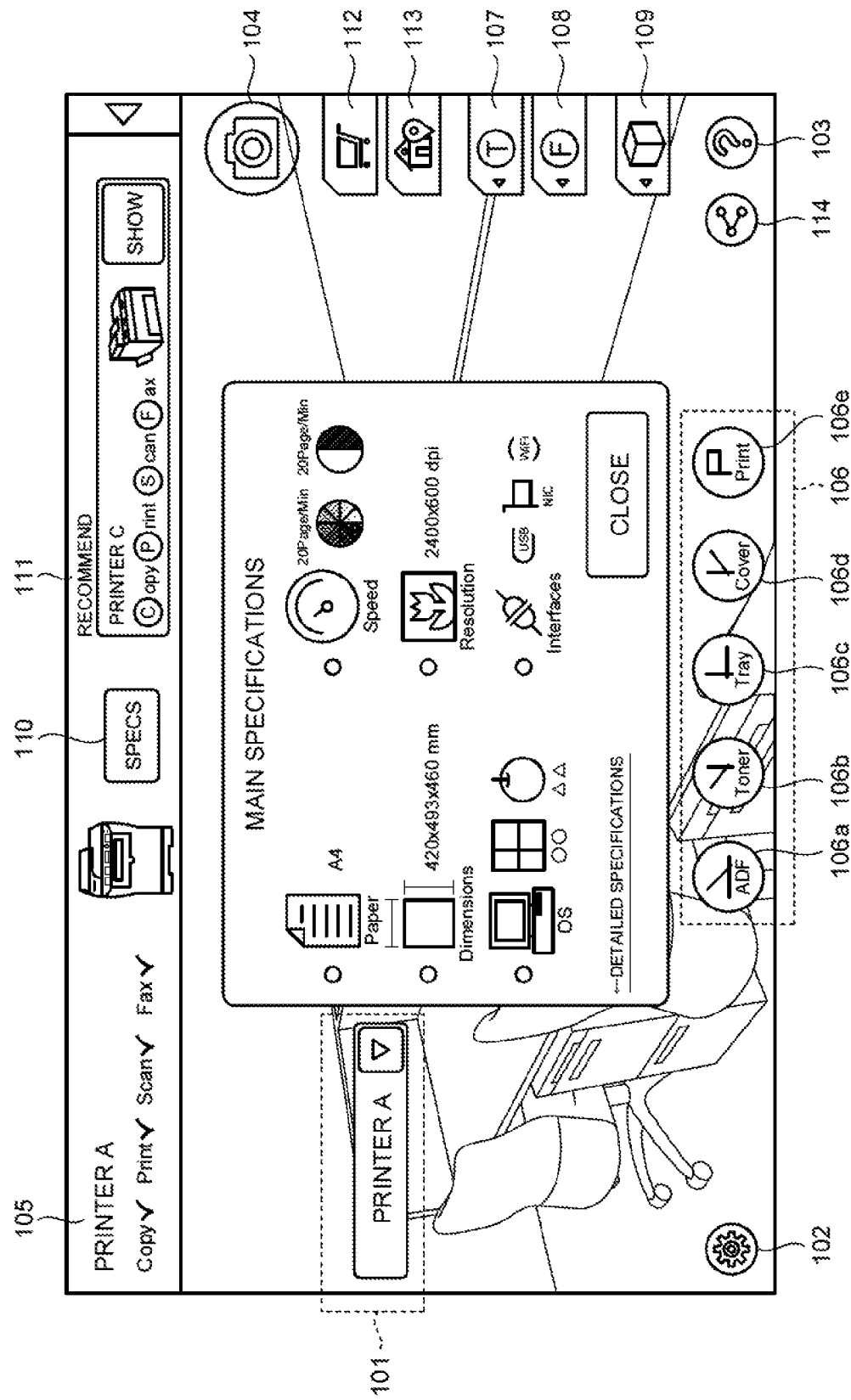

| MODEL NAME | MAIN UNIT |
|---|---|
| REFRIGERATOR Ra | MAIN UNIT IMAGE Ra |
| REFRIGERATOR Rb | MAIN UNIT IMAGE Rb |
| ⋮ | ⋮ |

FIG.27

| MODEL NAME | DOOR NUMBER | DOOR | | DISPLAY REFERENCE POINT |
| --- | --- | --- | --- | --- |
| | | OPEN | CLOSE | |
| REFRIGE-RATOR Ra | 1 | DOOR_OPEN IMAGE Ra1 | DOOR_CLOSE IMAGE Ra1 | (x_ra1, y_ra1, z_ra1) |
| | 2 | DOOR_OPEN IMAGE Ra2 | DOOR_CLOSE IMAGE Ra2 | (x_ra2, y_ra2, z_ra2) |
| | 3 | DOOR_OPEN IMAGE Ra3 | DOOR_CLOSE IMAGE Ra3 | (x_ra3, y_ra3, z_ra3) |
| REFRIGE-RATOR Rb | 1 | DOOR_OPEN IMAGE Rb1 | DOOR_CLOSE IMAGE Rb1 | (x_rb1, y_rb1, z_rb1) |
| | 2 | DOOR_OPEN IMAGE Rb2 | DOOR_CLOSE IMAGE Rb2 | (x_rb2, y_rb2, z_rb2) |
| ⋮ | ⋮ | ⋮ | ⋮ | ⋮ |

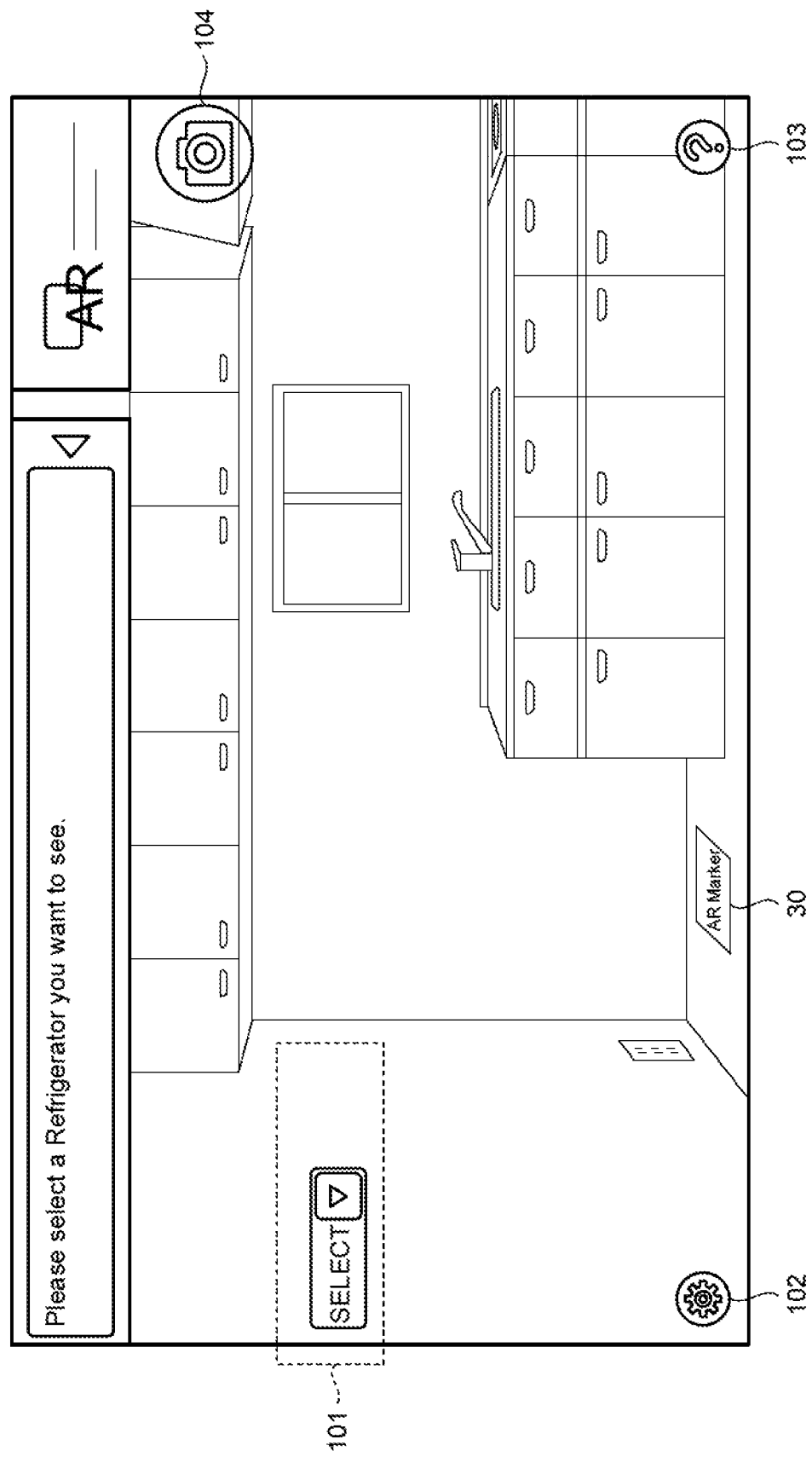

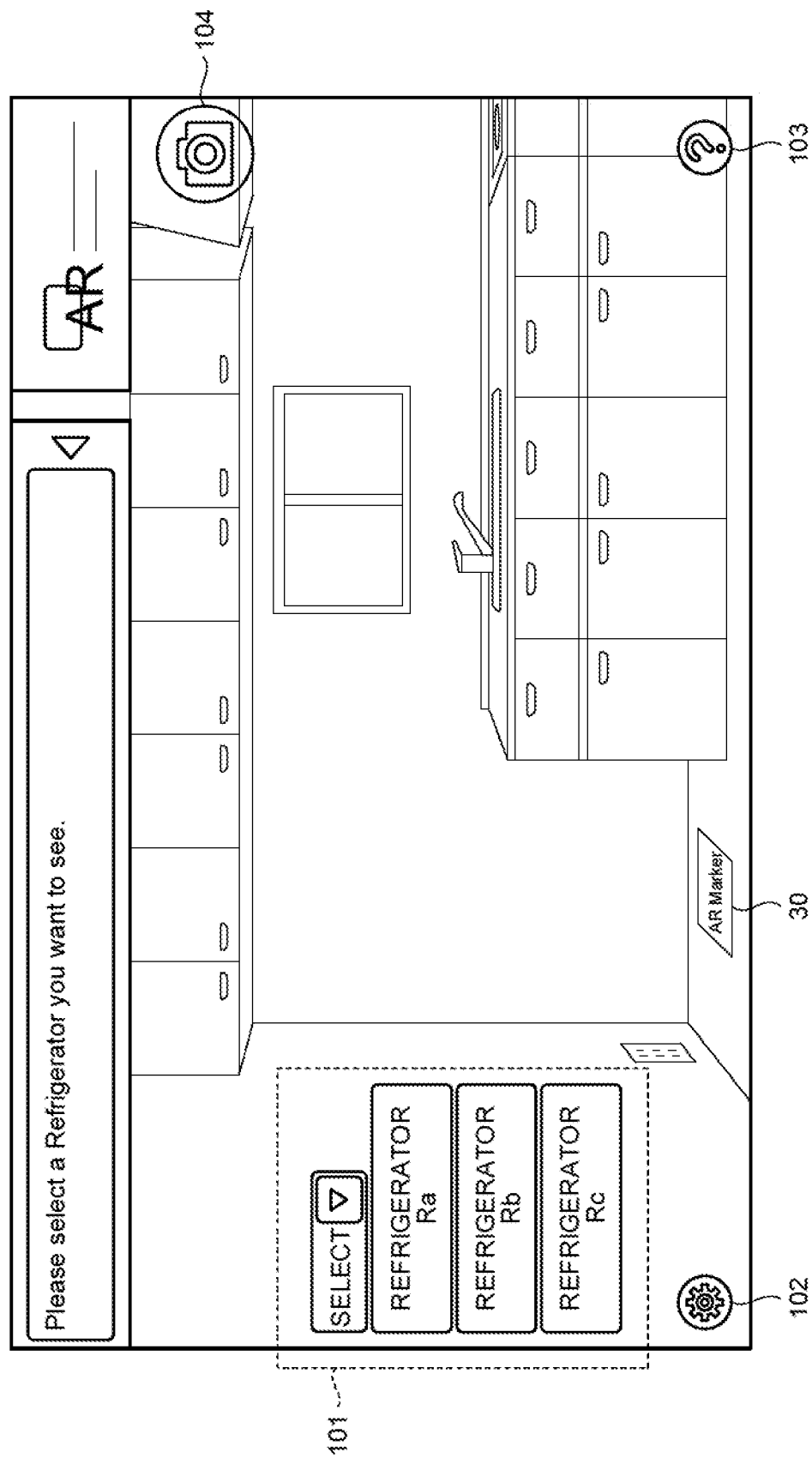

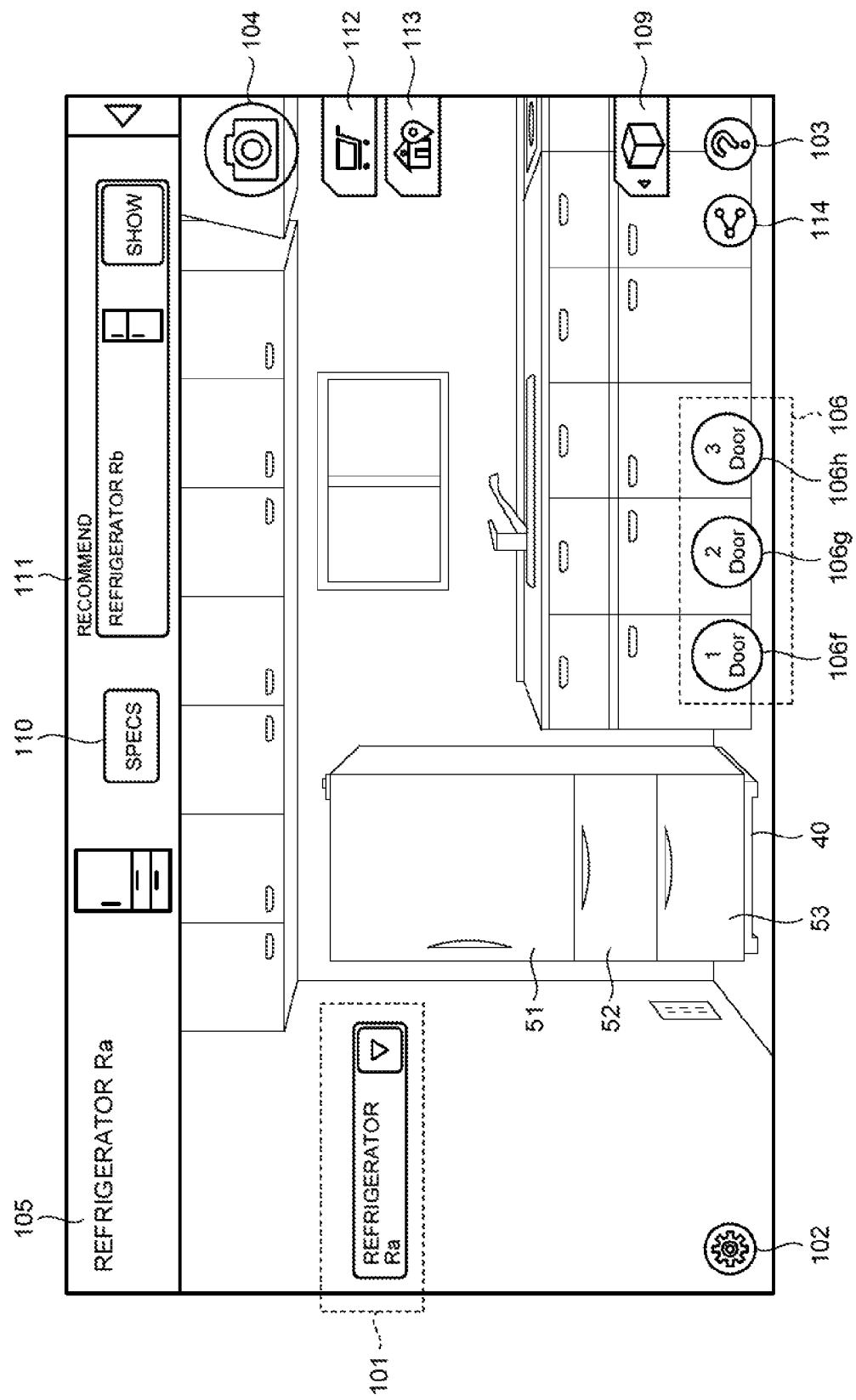

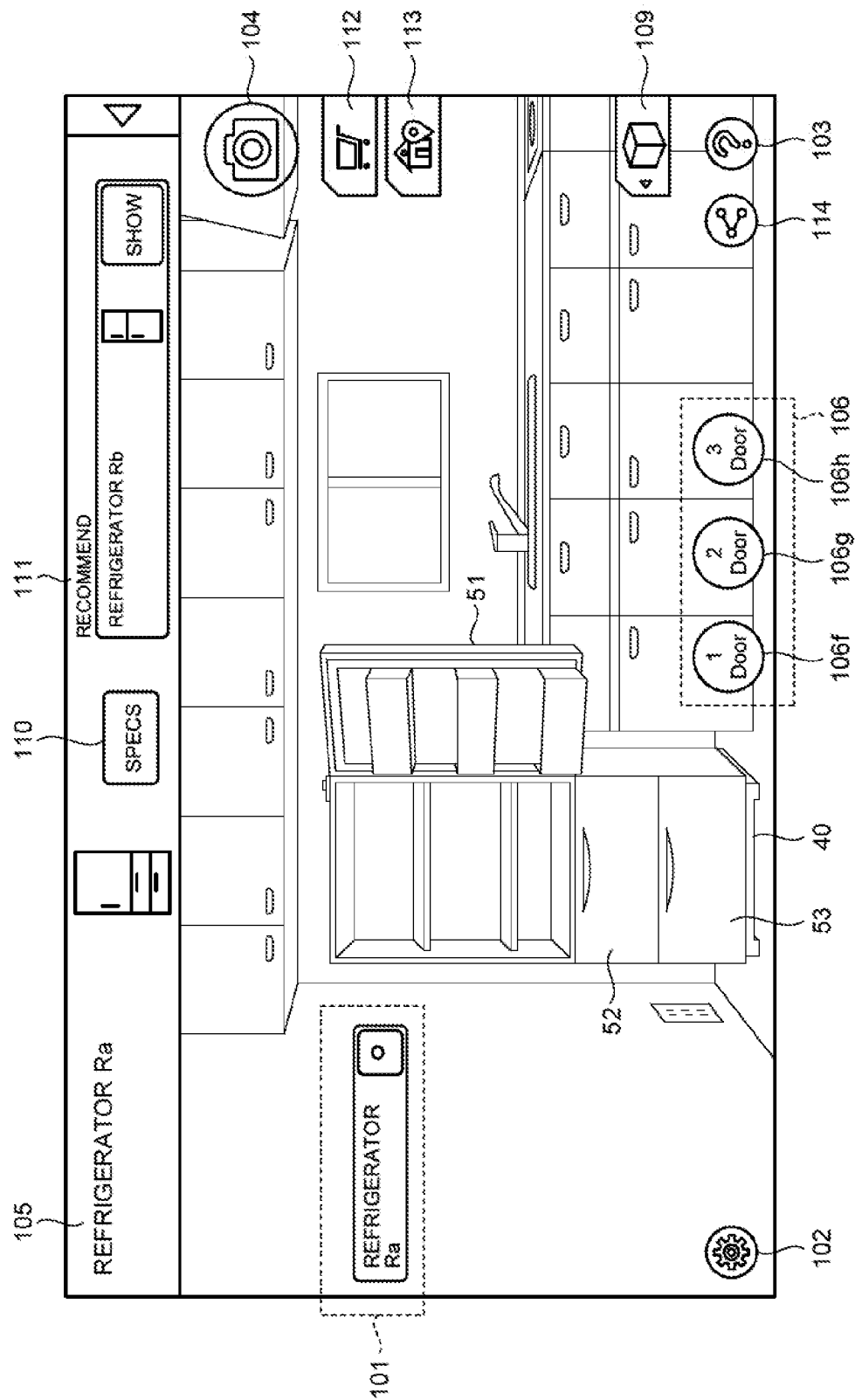

FIG.32

| VEHICLE MODEL NAME | VEHICLE BODY |
|---|---|
| AUTOMOBILE Ca | VEHICLE BODY IMAGE Ca |
| AUTOMOBILE Cb | VEHICLE BODY IMAGE Cb |
| ⋮ | ⋮ |

FIG.33

| VEHICLE MODEL NAME | OPENING/ CLOSING PART NAME | OPENING/CLOSING PART | | DISPLAY REFERENCE POINT |
| --- | --- | --- | --- | --- |
| | | OPEN | CLOSE | |
| AUTO-MOBILE Ca | BONNET | OPEN IMAGE Ca1 | CLOSE IMAGE Ca1 | (x_ca1, y_ca1, z_ca1) |
| | DRIVER | OPEN IMAGE Ca2 | CLOSE IMAGE Ca2 | (x_ca2, y_ca2, z_ca2) |
| | FRONT PASSENGER | OPEN IMAGE Ca3 | CLOSE IMAGE Ca3 | (x_ca3, y_ca3, z_ca3) |
| | RIGHT REAR PASSENGER | OPEN IMAGE Ca4 | CLOSE IMAGE Ca4 | (x_ca4, y_ca4, z_ca4) |
| | LEFT REAR PASSENGER | OPEN IMAGE Ca5 | CLOSE IMAGE Ca5 | (x_ca5, y_ca5, z_ca5) |
| | REAR TRUNK | OPEN IMAGE Ca6 | CLOSE IMAGE Ca6 | (x_ca6, y_ca6, z_ca6) |
| AUTO-MOBILE Cb | BONNET | OPEN IMAGE Cb1 | CLOSE IMAGE Cb1 | (x_cb1, y_cb1, z_cb1) |
| | DRIVER | OPEN IMAGE Cb2 | CLOSE IMAGE Cb2 | (x_cb2, y_cb2, z_cb2) |
| | FRONT PASSENGER | OPEN IMAGE Cb3 | CLOSE IMAGE Cb3 | (x_cb3, y_cb3, z_cb3) |
| | REAR TRUNK | OPEN IMAGE Cb4 | CLOSE IMAGE Cb4 | (x_cb4, y_cb4, z_cb4) |
| ⋮ | ⋮ | ⋮ | ⋮ | ⋮ |

INFORMATION PROCESSING APPARATUS, INFORMATION PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2015-005364 filed in Japan on Jan. 14, 2015 and Japanese Patent Application No. 2015-199712 filed in Japan on Oct. 7, 2015.

BACKGROUND OF THE INVENTION

1. Field of the Invention

The present invention relates to an information processing apparatus, an information processing method, and a computer-readable recording medium.

2. Description of the Related Art

Augmented reality (AR) technologies are heretofore known with which a virtual object is displayed in combination with a captured image representing a real space imaged by a camera. For example, with a known AR technology, when a user takes an image of paper or the like with a certain pattern (AR marker), a virtual object is three-dimensionally displayed superimposed on the captured image according to a positional relation between the paper and the camera. By referring to the virtual object displayed super imposed on the captured image, the user can imagine at case in which an object corresponding to the virtual object is actually placed.

Japanese Patent No. 4032776 discloses an invention of a mixed reality display device that presents to the user a virtual reality world that provides harmony between the appearance, such as the size and color, of a real object and the surrounding environment without placing the real object in the real space.

However, conventional technologies do not allow the user to easily imagine a case in which a movable part of the object is operated, even by displaying the virtual object, corresponding to the object so as to be superimposed on the captured image.

In view of the above-described conventional technologies, there is a need to provide an information processing apparatus, an information processing method, and a computer-readable recording medium having a program that can allow a user to more clearly imagine a case in which a movable part of an object is operated.

SUMMARY OF THE INVENTION

It is an object of the present invention to at least partially solve the problems in the conventional technology.

According to exemplary embodiments of the present invention, there is provided an information processing apparatus comprising: an imaging unit that obtains a captured image including position identification information identifying a position in which a virtual object represented by an image including an immovable part and a movable part is to be displayed; a generator that generates a composite image obtained by combining the virtual object with the captured image in the position thereof identified by the position identification information; a display unit that displays thereon the composite image; an operation receiver that receives an operation on the movable part included in the composite image displayed on the display unit; and a display controller that controls the display of the movable part, based on display setting information for displaying the virtual object, when the operation receiver has received the operation on the movable part.

Exemplary embodiments of the present invention also provides a method for information processing conducted by an information processing apparatus, the method comprising: obtaining a captured image including position identification information identifying a position in which a virtual object represented by an image including an immovable part and a movable part is to be displayed; generating a composite image obtained by combining the virtual object with the captured image in the position thereof identified by the position identification information; receiving an operation on the movable part included in the composite image displayed on a display unit; and controlling the display of the movable part, based on display setting information for displaying the virtual object, when the operation on the movable part has been received at the receiving.

Exemplary embodiments of the present invention also provides a non-transitory computer-readable recording medium that contains a computer program that causes a processor included in an information processing apparatus that comprises the processor, a display unit, and an imaging unit that obtains a captured image including position identification information identifying a position in which a virtual object represented by an image including an immovable part and a movable part is to be displayed, to function as: a generator that generates a composite image obtained by combining the virtual object with the captured image in the position thereof identified by the position identification information; an operation receiver that receives an operation on the movable part included in the composite image displayed on the display unit; and a display controller that controls the display of the movable part, based on display setting information for displaying the virtual object, when the operation receiver has received the operation on the movable part.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of detachable part image information (in the case of Bank) according to the first embodiment;

FIG. 7 is a diagram illustrating another example of the detachable part image information (in the case of Finisher) according to the first embodiment;

FIG. 8 is a diagram illustrating an example of movable part image information (in the case of ADF) according to the first embodiment;

FIG. 9 is a diagram illustrating another example of the movable part image information (in the case of Toner cover) according to the first embodiment;

FIG. 10 is a diagram illustrating still another example of the movable part image information (in the case of Paper tray) according to the first embodiment;

FIG. 11 is a diagram illustrating still another example of the movable part image information (in the case of Duplex unit cover) according to the first embodiment;

FIG. 12 is a diagram illustrating an example of device operation image information (in the case of Print operation) according to the first embodiment;

FIG. 16 is a diagram illustrating an example of a model display screen (in the case of Printer A) according to the first embodiment;

FIG. 17B is a diagram illustrating an example of the animation representing the operation of opening the toner cover according to the first embodiment;

FIG. 18A is a diagram illustrating an example of an animation representing an operation of closing the toner cover according to the first embodiment;

FIG. 18C is a diagram illustrating an example of the animation representing the operation of closing the toner cover according to the first embodiment;

FIG. 19 is a diagram illustrating an example of the model display screen of the first embodiment after an ADF operation button is pressed;

FIG. 20A is a diagram illustrating an example of a bank selection screen according to the first embodiment;

FIG. 20B is a diagram illustrating an example of the model display screen of the first embodiment after a bank is selected;

FIG. 21 is a diagram illustrating an example of an installation limit area specifying screen according to the first embodiment;

FIG. 22 is a diagram illustrating an example of a product specification screen according to the first embodiment;

FIG. 27 is a diagram illustrating an example of the movable part image information (in the case of Door) according to the second embodiment;

FIG. 28 is a diagram illustrating an example of the model selection screen according to the second embodiment;

FIG. 29 is a diagram illustrating another example of the model selection screen (where a list is displayed) according to the second embodiment;

FIG. 30 is a diagram illustrating an example of the model display screen (in the case of Refrigerator Ra) according to the second embodiment;

FIG. 31 is a diagram illustrating an example of the model display screen of the second embodiment after a first-door operation button is pressed;

FIG. 32 is a diagram illustrating an example of the initial display image information (in the case of Automobile) according to a third embodiment of the present invention;

FIG. 33 is a diagram illustrating an example of device movable part image information (in the case of Opening/closing part of automobile) according to the third embodiment;

DETAILED DESCRIPTION OF THE PREFERRED EMBODIMENTS

The following describes in detail embodiments of an information processing apparatus, an information processing method, and a computer-readable recording medium having a program according to the present invention, with reference to the accompanying drawings.

First Embodiment

Figure 1:
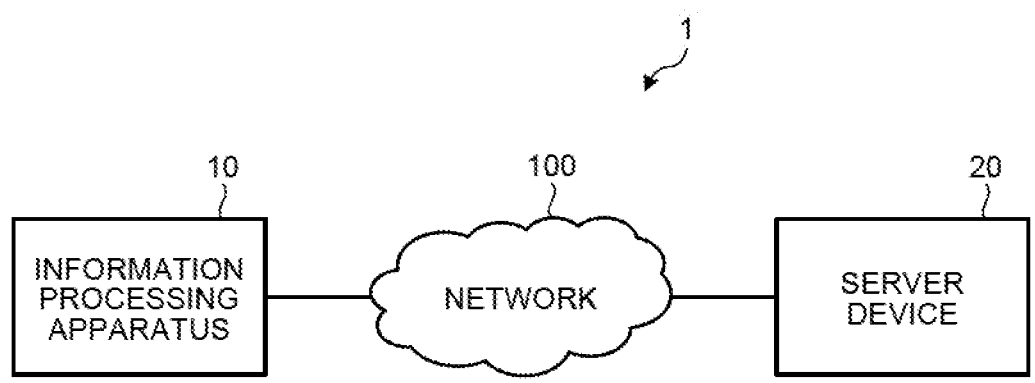
FIG. 1 is a diagram illustrating an example of a configuration of an information processing system according to a first embodiment of the present invention.

FIG. 1 is a diagram illustrating an example of a configuration of an information processing system 1 according to a first embodiment of the present invention. The information processing system 1 of the present embodiment includes an information processing apparatus 10 and a server device 20. The information processing apparatus 10 is connected to the server device 20 through a network 100. The communication system of the network 100 may be a wireless system, a wired system, or at combination of wireless and wired systems. The network 100 is, for example, the Internet.

The information processing apparatus 10 displays a composite image obtained by combining a virtual object with a captured image obtained by imaging any place. The virtual object is a three-dimensional (3D) model of any object. In the first embodiment, a case will be described in which an object corresponding to the virtual object is office equipment. While the first embodiment will be described by exemplifying a case in which the office equipment is a printer (printing device), the office equipment is not limited to the printer, but may be any kind of office equipment.

Examples of the information processing apparatus 10 include a smart device with a camera.

The server device 20 stores therein information, such as an application (program) for causing the information processing apparatus 10 to display the composite image including the virtual object, image information representing an augmented reality (AR) marker, and display setting information for displaying the virtual object. The AR marker is position identification information for identifying a position in which the virtual object is to foe combined with the captured image. The display setting information will be described later in detail with reference to FIGS. 5 to 12. The information stored, in the server device 20 is downloaded to the information processing apparatus 10 via a website set up on, for example, the server device 20.

Figure 2A:
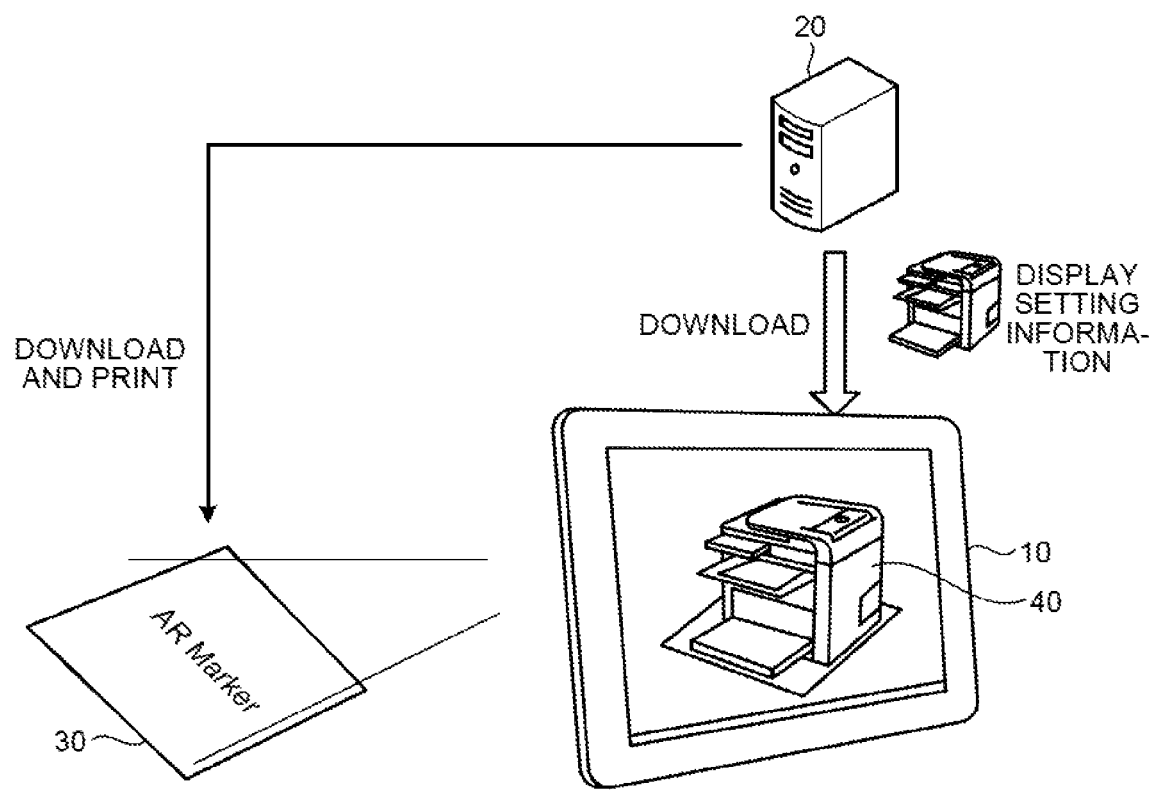
FIG. 2A is a diagram illustrating Example 1 of an overview of a method for displaying a virtual object according to the first embodiment.

FIG. 2A is a diagram illustrating Example 1 of an overview of a method for displaying a virtual object 40 according to the first embodiment. First, a user of the information processing apparatus 10 prints the image information representing the AR marker 30 stored in the server device 20 or the information processing apparatus 10, and places a printed material indicating the AR marker 30 at a place where the virtual object 40 is to be displayed. Then, the information processing apparatus 10 downloads, from the server device 20, the display setting information for a model to be displayed as the virtual object 40. The information processing apparatus 10 subsequently obtains a captured image including the printed material indicating the AR marker 30, and then, the virtual object 40 corresponding to the display setting information is displayed at the place of the printed material included in the captured image.

While FIGS. 1 and 2A illustrate the configuration including one such server device 20, this configuration is not the only possible one for the information processing apparatus 10 to obtain the information stored in the server device 20.

Figure 2B:
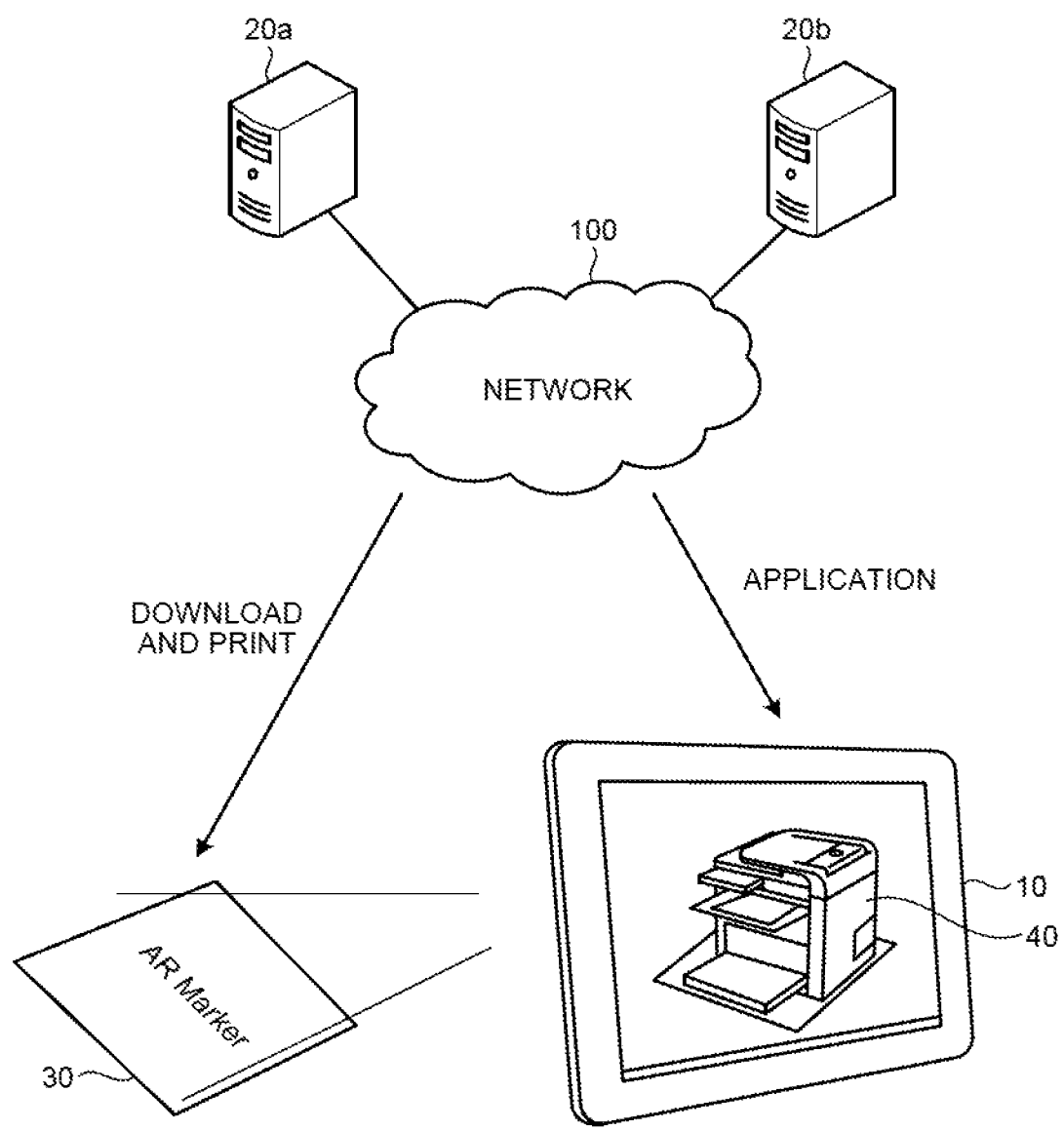
FIG. 2B is a diagram illustrating Example 2 of the overview of the method for displaying the virtual object according to the first embodiment.

FIG. 2B is a diagram illustrating Example 2 of the overview of the method for displaying the virtual object 40 according to the first embodiment. The example of FIG. 2B illustrates a case in which the server device 20 is distributed as server devices 20a and 20b on the network 100. First, the developer of the application stores the application containing in advance the display setting information including information on, for example, image data (such as model data of an image displayed as a 3D model) of the virtual object 40 into the server device 20a (such as a server of the developer). Then, the application is released from the server device 20a to the server device 20b that operates, for example, an application sales website on the network 100. Then, the information processing apparatus 10 downloads the application from the server device 20b. In this manner, the example of the configuration of FIG. 2B can also provide the environment allowing the information processing apparatus 10 to install the application. The information processing apparatus 10 may download the AR marker 30 from the server device 20a as needed.

The following describes an overview of the virtual object 40 displayed by the information processing apparatus 10 of the first embodiment.

Figure 3A:
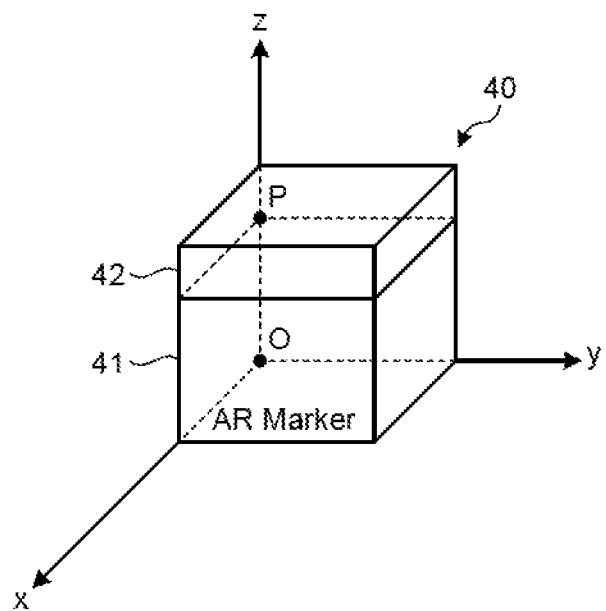
FIG. 3A is a diagram illustrating an overview of the virtual object according to the first embodiment.

FIG. 3A is a diagram illustrating the overview of the virtual object 40 according to the first embodiment. The virtual object 40 of the first embodiment includes a first region 41 representing an immovable part and a second region 42 representing a movable part. The example of the virtual object 40 of FIG. 3A assumes, for simplicity, that the virtual object 40 includes one such second region 42 representing the movable part. The virtual object 40 may, however, include any number of such second regions 42 representing the movable parts. The virtual object 40 of FIG. 3A is, for example, a printer. The second region 42 is, for example, an automatic document feeder (ADF) portion of the printer.

Figure 3B:
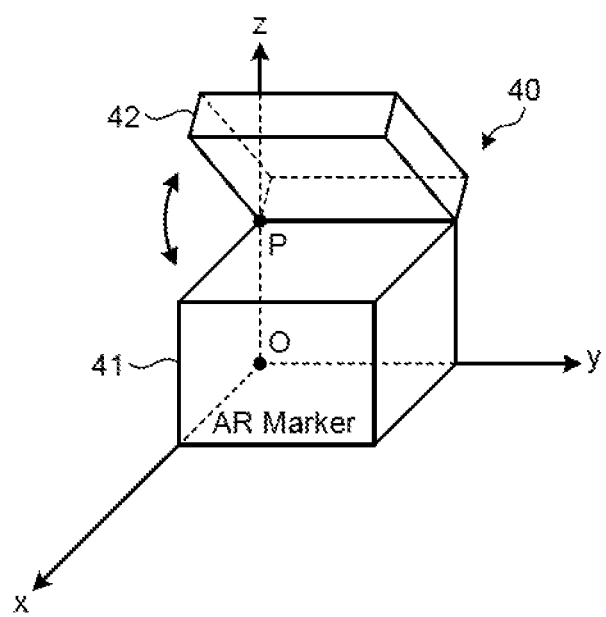
FIG. 3B is a diagram illustrating the overview of the virtual object according to the first embodiment when a movable part thereof is operated.

FIG. 3B is a diagram illustrating the overview of the virtual object 40 according to the first embodiment (when the movable part is operated). The example of FIG. 3B illustrates a case in which the second region 42 of the virtual object 40 is openable and closable. The virtual object 40 is first displayed in the initial display state of FIG. 3A on the information processing apparatus 10. After the information processing apparatus 10 receives an input for operating the second region 42, the display of the virtual object 40 changes from the state of FIG. 3A to the state of FIG. 3B. At this time, the operation during opening and closing of the second region 42 is displayed as a moving image. The moving image is, for example, an animation. A display reference point P in FIGS. 3A and 3B represents a reference point specifying a position to display the moving image. The coordinates of the display reference point P are represented in a coordinate system with the origin at, for example, a predetermined point O of the virtual object 40.

The following describes an example of a configuration of the information processing apparatus 10 according to the first embodiment.

Figures 4, 5:
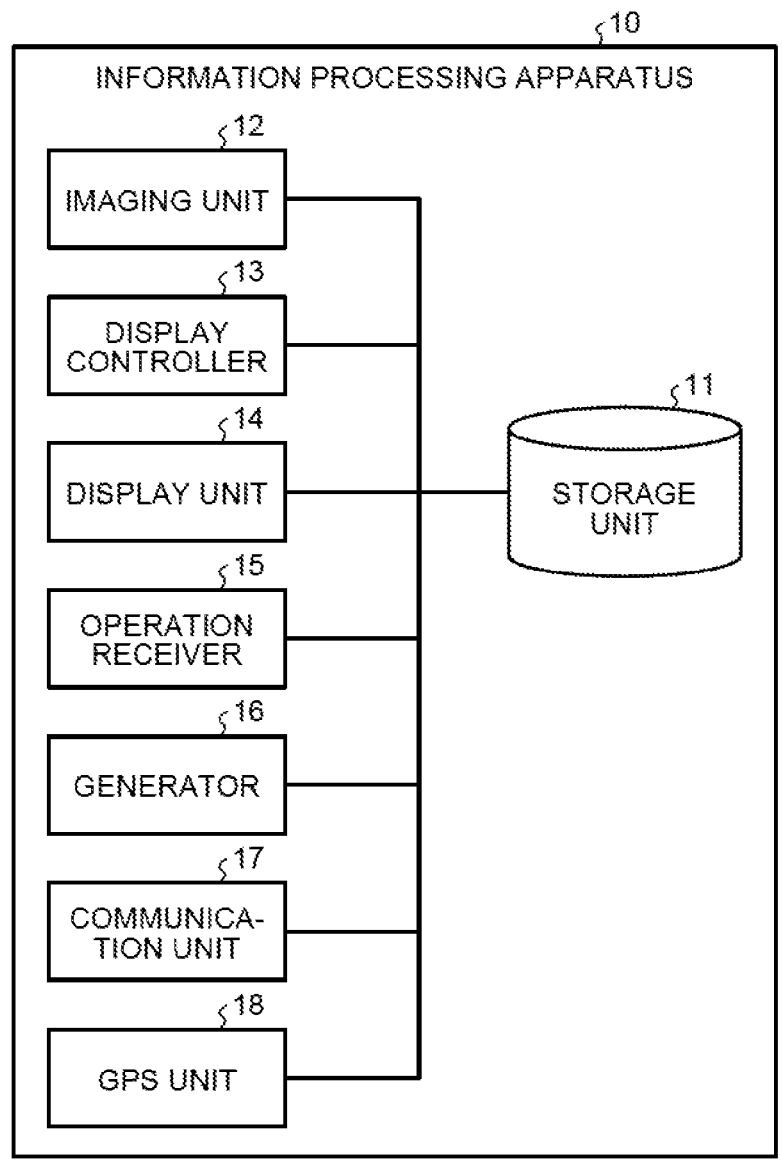
FIG. 4 is a diagram illustrating an example of a configuration of an information processing apparatus according to the first embodiment.
FIG. 5 is a diagram illustrating an example of initial display image information (in the case of Printer) according to the first embodiment.

FIG. 4 is a diagram illustrating the example of the configuration of the information processing apparatus 10 according to the first embodiment. The information processing apparatus 10 includes a storage unit 11, an imaging unit 12, a display controller 13, a display unit 14, an operation receiver 15, a generator 16, a communication unit 17, and a Global Positioning System (GPS) unit 18. While the information processing apparatus 10 may be any apparatus, the first embodiment will be described by exemplifying a case in which the information processing apparatus 10 is a smart device, such as a smartphone or a tablet computer. Specifically, the display unit 14 and the operation receiver 15 are a liquid-crystal touch panel.

The storage unit 11 stores therein the display setting information for displaying the virtual object 40 on a type-by-type basis of the virtual object 40. The display setting information includes, for example, initial display image information, detachable part image information, movable part image information, and device operation image information. The storage unit 11 also stores therein information, such as specification information on printers corresponding to the virtual object 40, addresses of websites from which the printers corresponding to the virtual object 40 are available (purchasable), and addresses of places (stores) from which the printers corresponding to the virtual object 40 are available (purchasable). The information in the storage unit 11 is updated by the communication unit 17 through communication with the server device 20. For example, the communication unit 17 newly obtains the display setting information on the virtual object 40 from the server device 20, and stores the obtained display setting information in the storage unit 11 so that the information processing apparatus 10 can display the new virtual object 40 for a new product or the like.

The following describes the display setting information (initial display image information, detachable part image information, movable part image information, and device operation image information) by exemplifying a case in which the virtual object 40 corresponds to the printers.

First, an example of the initial display image information according to the first embodiment will be described.

FIG. 5 is a diagram illustrating the example of the initial display image information (in the case of Printer) according to the first embodiment. The initial display image information indicates a state when the virtual object 40 starts to be displayed. The initial display image information includes the following items: Model name, Main unit, Bank, and Finisher. Model name represents a name of a model of a printer. In the first embodiment, Model name serves as identification information for identifying a type of the virtual object 40. Main unit represents specifying information for specifying a main unit image in the state in which a detachable part (optional part) is not attached. The specifying information is, for example, an image file name. The main unit image is displayed at the location of the AR marker 30 included in the captured image taken by the information processing apparatus 10.

Bank is an optional part for storing sheets of paper used for printing. Bank is set to "-", "No", and a value of "1", "2", or the like. The symbol "-" indicates that no bank can be installed in the printer main unit. "No" indicates that no bank is installed in a model in which the bank is installable. The value "1" indicates that one bank is installed in a model in which the bank is installable. The value "2" indicates that two banks are installed in a model in which the bank is installable. An image representing the bank is specified by the detachable part image information (to be described later).

Finisher is an optional part for performing post-printing processing, such as punching (hole making) and stapling of the printed material. Finisher is set to "-", "No", or "Yes". The symbol "-" indicates that no finisher can foe installed on the printer main unit. "No" indicates that no finisher is installed on a model on which the finisher is installable. "Yes" indicates that a finisher is installed on a model on which the finisher is installable. An image representing the finisher is specified by the detachable part image information (to be described later).

For example, in the example of FIG. 5, if the information processing apparatus 10 initially displays the virtual object 40 corresponding to Printer B, the virtual object 40 based on Main unit image B equipped with neither a bank nor a finisher is displayed.

The following describes examples of the detachable part image information according to the first embodiment.

FIG. 6 is a diagram illustrating an example of device detachable part image information (in the case of the Bank) according to the first embodiment. The detachable part image information of FIG. 6 includes the following items: Model name, Bank, Display reference point, and Maximum number of banks. Model name represents the name of the model of the printer. Bank represents specifying information for specifying an image representing the bank. The specifying information is, for example, an image file name. A setting of "-" for Bank indicates that no bank can be installed in the printer main unit. Display reference point represents a position to display the image representing the bank. For example, the information processing apparatus 10 displays the image representing the bank as a virtual detachable object so as to place an end point of the image representing the bank at the coordinates of the display reference point. Maximum number of banks represents the number of banks installable in the printer main unit. If a plurality of types of banks are installable in the same printer main unit, the storage unit 11 stores therein the detachable part image information bank type-by-bank type.

For example, in the example of Printer B of FIG. 6, Bank image B serves as the image representing the bank of Printer B. The position to display Bank image B is specified by coordinates (x_b6, y_b6, z_b6) of the display reference point. The number of banks installable in Printer B is three.

FIG. 7 is a diagram illustrating another example of the detachable part image Information (in the case of the Finisher) according to the first embodiment. The detachable part image information of FIG. 7 includes the following items: Model name, Finisher, and Display reference point. Model name represents the name of the model of the printer. Finisher represents specifying information for specifying an image representing the finisher. The specifying information is, for example, an image file name. A setting of "-" for Finisher indicates that no finisher can be installed on the printer main unit. Display reference point represents a position to display the image representing the finisher. For example, the information processing apparatus 10 displays the image representing the finisher as the virtual detachable object so as to place an end point of the image representing the finisher at the coordinates of the display reference point. If a plurality of types of finishers are installable on the same printer main unit, the storage unit 11 stores therein the detachable part image information finisher type-by-finisher type.

For example, in the example of Printer B of FIG. 7, Finisher image B serves as the image representing the finisher of Printer B. The position to display Finisher image B is specified by coordinates (x_b7, y_b7, z_b7) of the display reference point, The following describes examples of the movable part image information according to the first embodiment.

FIG. 8 is a diagram illustrating an example of the movable part image information (in the case of ADF) according to the first embodiment. The movable part image information of FIG. 8 includes the following items: Model name, ADF (open), ADF (close), and Display reference point. Model name represents the name of the model of the printer. ADF (open) represents specifying information for specifying an image (animation) representing an operation of opening an ADF. ADF (close) represents specifying information for specifying an image (animation) representing an operation of closing the ADF. The specifying information is, for example, an image file name. A setting of "-" for ADF (open) and ADF (close) indicates that the printer main unit is equipped with no ADF. Display reference point represents a position to display the image (animation) representing the operation of opening the ADF and the image (animation) representing the operation of closing the ADF.

For example, in the example of Printer A of FIG. 8, ADF_open image A serves as the image (animation) representing the operation of opening the ADF of Printer A, and ADF_close image A serves as the image (animation) representing the operation of closing the ADF of Printer A. The position to display ADF_open image A and ADF_close image A is specified by coordinates (x_a1, y_a1, z_a1) of the display reference point.

FIG. 9 is a diagram illustrating another example of the movable part image information (in the case of Toner cover) according to the first embodiment. The movable part image information of FIG. 9 includes the following items: Model name, Toner cover (open), Toner cover (close), and Display reference point. Model name represents the name of the model of the printer. Toner cover (open) represents specifying information for specifying an image (animation) representing an operation of opening a toner cover. Toner cover (close) represents specifying information for specifying an image (animation) representing an operation of closing the toner cover. The specifying information is, for example, an image file name. A setting of "-" for Toner cover (open) and Toner cover (close) indicates that the printer main unit is equipped with no toner cover. Display reference point represents a position to display the image (animation) representing the operation of opening the toner cover and the image (animation) representing the operation of closing the toner cover.

For example, in the example of Printer A of FIG. 9, Toner_open image A serves as the image (animation) representing the operation of opening the toner cover of Printer A, and Toner_close image A serves as the image (animation) representing the operation of closing the toner cover of Printer A. The position to display Toner_open image A and Toner_close image A is specified by coordinates (x_a2, y_a2, z_a2) of the display reference point.

FIG. 10 is a diagram illustrating still another example of the movable part image information (in the case of Paper tray) according to the first embodiment. The movable part image information of FIG. 10 includes the following items: Model name, Paper tray (open), Paper tray (close), and Display reference point. Model name represents the name of the model of the printer. Paper tray (open) represents specifying information for specifying an image (animation) representing an operation of opening a paper tray. Paper tray (close) represents specifying information for specifying an image (animation) representing an operation of closing the paper tray. The specifying information is, for example, an image file name. A setting of "-" for Paper tray (open) and Paper tray (close) indicates that the printer main unit is equipped with no paper tray. Display reference point represents a position to display the image (animation) representing the operation of opening the paper tray and the image (animation) representing the operation of closing the paper tray.

For example, in the example of Printer A of FIG. 10, Tray_open image A serves as the image (animation) representing the operation of opening the paper tray of Printer A, and Tray_close image A serves as the image (animation) representing the operation of closing the paper tray of Printer A. The position to display Tray_open image A and Tray_close image A is specified by coordinates (x_a3, y_a3, z_a3) of the display reference point.

FIG. 11 is a diagram illustrating still another example of the movable part image information (in the case of Duplex unit cover) according to the first embodiment. The movable part image information of FIG. 11 includes the following items: Model name, Duplex unit cover (open), Duplex unit cover (close), and Display reference point. Model name represents the name of the model of the printer. Duplex unit cover (open) represents specifying information for specifying an image (animation) representing an operation of opening a duplex unit cover. Duplex unit cover (close) represents specifying information for specifying an image (animation) representing an operation of closing the duplex unit cover. The specifying information is, for example, an image file name. A setting of "-" for Duplex unit cover (open) and Duplex unit cover (close) indicates that the printer main unit is equipped with no duplex unit cover. Display reference point represents a position to display the image (animation) representing the operation of opening the duplex unit cover and the image (animation) representing the operation of closing the duplex unit cover.

For example, in the example of Printer A of FIG. 11, Cover_open image A serves as the image (animation) representing the operation of opening the duplex unit cover of Printer A, and Cover_close image A serves as the image (animation) representing the operation of closing the duplex unit cover of Printer A. The position to display Cover_open image A and Cover_close image A is specified by coordinates (x_a4, y_a4, z_a4) of the display reference point.

FIG. 12 is a diagram illustrating an example of the device operation image information (in the case of Print operation) according to the first embodiment. The device operation image information of FIG. 12 includes the following items: Model name, Print operation, and Display reference point. Model name represents the name of the model of the printer. Print operation represents specifying information for specifying an image (animation) representing a state of ejecting the printed material from the printer when the printing has been performed. The specifying information is, for example, an image file name. A setting of "-" for Print operation indicates that no image (animation) is available for representing the state of ejecting the printed material from the printer when the printing has been performed. Display reference point represents a position to display the image (animation) representing the state of ejecting the printed material from the printer when the printing has been performed.

For example, in the example of Printer A of FIG. 12, Print image A serves as the image (animation) representing the state of ejecting the printed material from Printer A when the printing has been performed. The position to display Print image A is specified by coordinates (x_a5, y_a5, z_a5) of the display reference point.

Referring back to FIG. 4, the imaging unit 12 captures the image including the AR marker 30 indicating the position to display the virtual object 40, and then, supplies the captured image to the display controller 13. The imaging unit 12 continues to image the captured image. In other words, the captured image is supplied as a moving image to the display controller 13.

The display controller 13 receives the captured image from the imaging unit 12, and then, displays, on the display unit 14, a model selection screen with the captured image used as a background of the screen.

Figure 13:
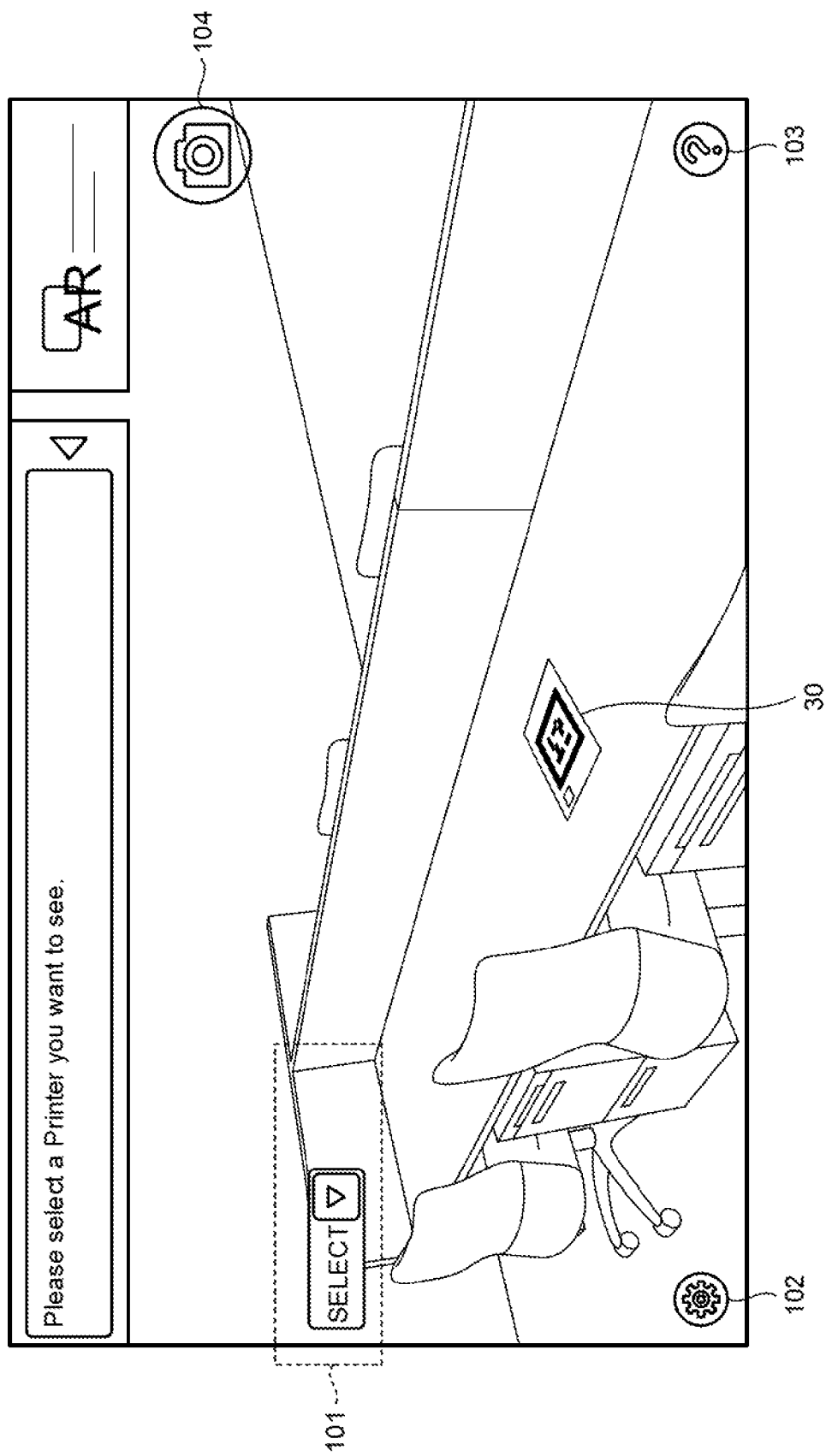
FIG. 13 is a diagram illustrating an example of a model selection screen according to the first embodiment.

FIG. 13 is a diagram illustrating an example of device model selection screen according to the first embodiment. The model selection screen of the first embodiment includes a model selection button 101, a setting button 102, a help button 103, and a camera button 104.

The model selection button 101 is a drop-down list button for selecting a model of the printer. Pressing the model selection button 101 of the operation receiver 15 causes the display controller 13 to display, on the display unit 14, a list of model names of printers stored as the above-described display setting information in the storage unit 11.

The setting button 102 is a button for displaying a setting screen for changing display settings, such as the display language (such as Japanese, English, or Chinese) and the character size. The setting screen may be a region selection screen for applying a predefined setting by selecting a region.

Figure 14:
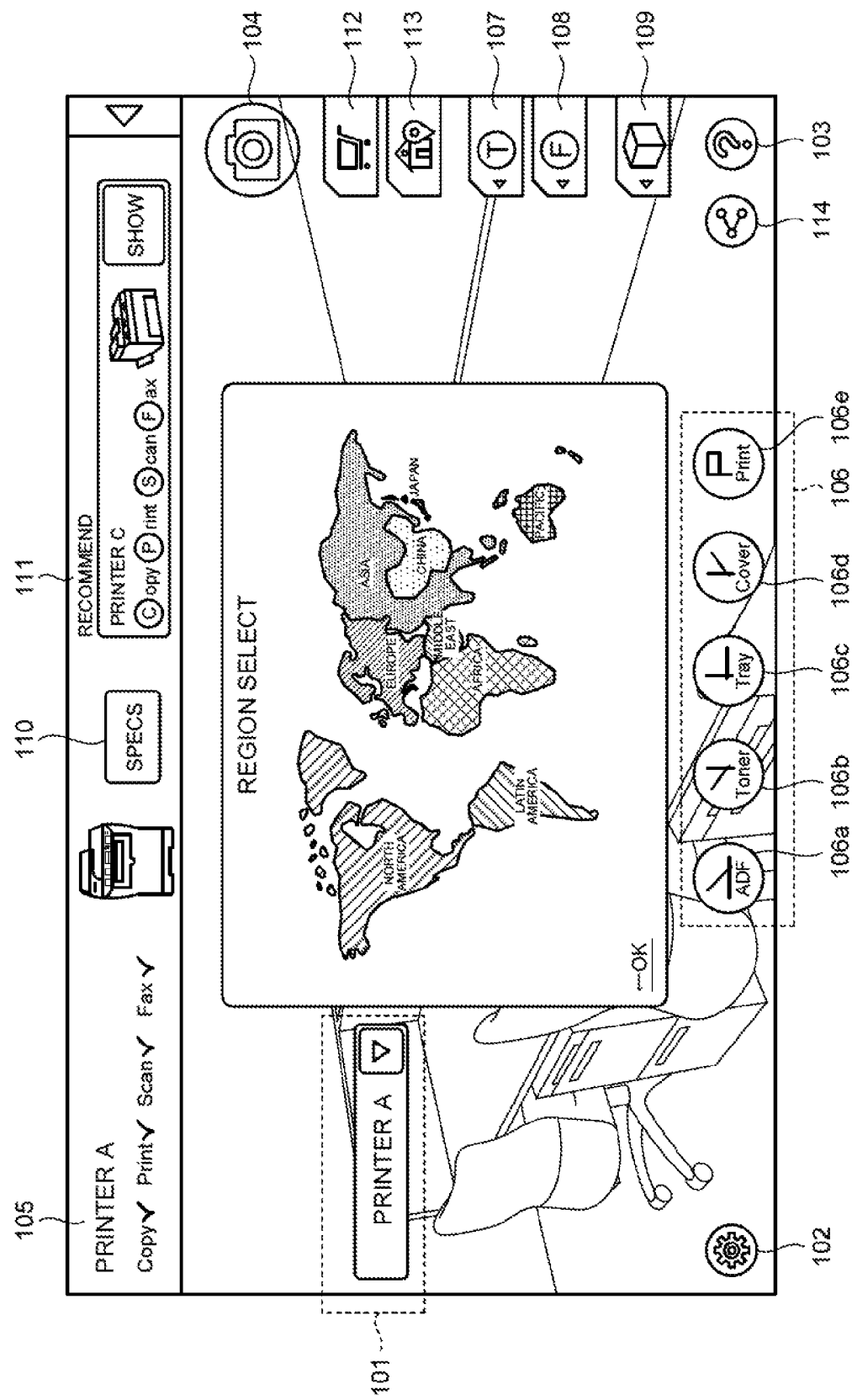
FIG. 14 is a diagram illustrating an example of a region selection screen according to the first embodiment.

FIG. 14 is a diagram illustrating an example of the region selection screen according to the first embodiment. The example of FIG. 14 illustrates a case of selecting a region from a plurality of regions (Japan, China, Europe, Middle East, Africa, Asia, North America, Latin America, and Pacific). The display controller 13 sets the brightness of an image area representing a region selected by the user higher than the brightness of image areas representing the regions not selected by the user.

The display controller 13 performs display control based on region setting information associated with the selected region. The region setting information is information indicating a display method corresponding to the region. The region setting information includes, for example, display languages, character sizes, Uniform Resource Locator (URL) information, model names, and purchasable model information. The URL information includes, for example, URLs of websites each displayed when a product purchase button 112 (to be described later) is pressed. The purchasable model information indicates purchasable models in the selected region. For example, pressing a recommended product display button 111 (to be described later) displays, based on the purchasable model information, a model similar in product specifications to a model displayed in a model display part 105 (to be described later) among the purchasable models in the selected region.

Referring back to FIG. 13, the help button 103 is a button for displaying a help screen for presenting operating instructions.

The camera button 104 is a button for capturing an image to be displayed as the background. While the virtual object 40 is displayed, pressing the camera button 104 of the operation receiver 15 stores the composite image including the virtual object 40 in, for example, the storage unit 11.

Figure 15:
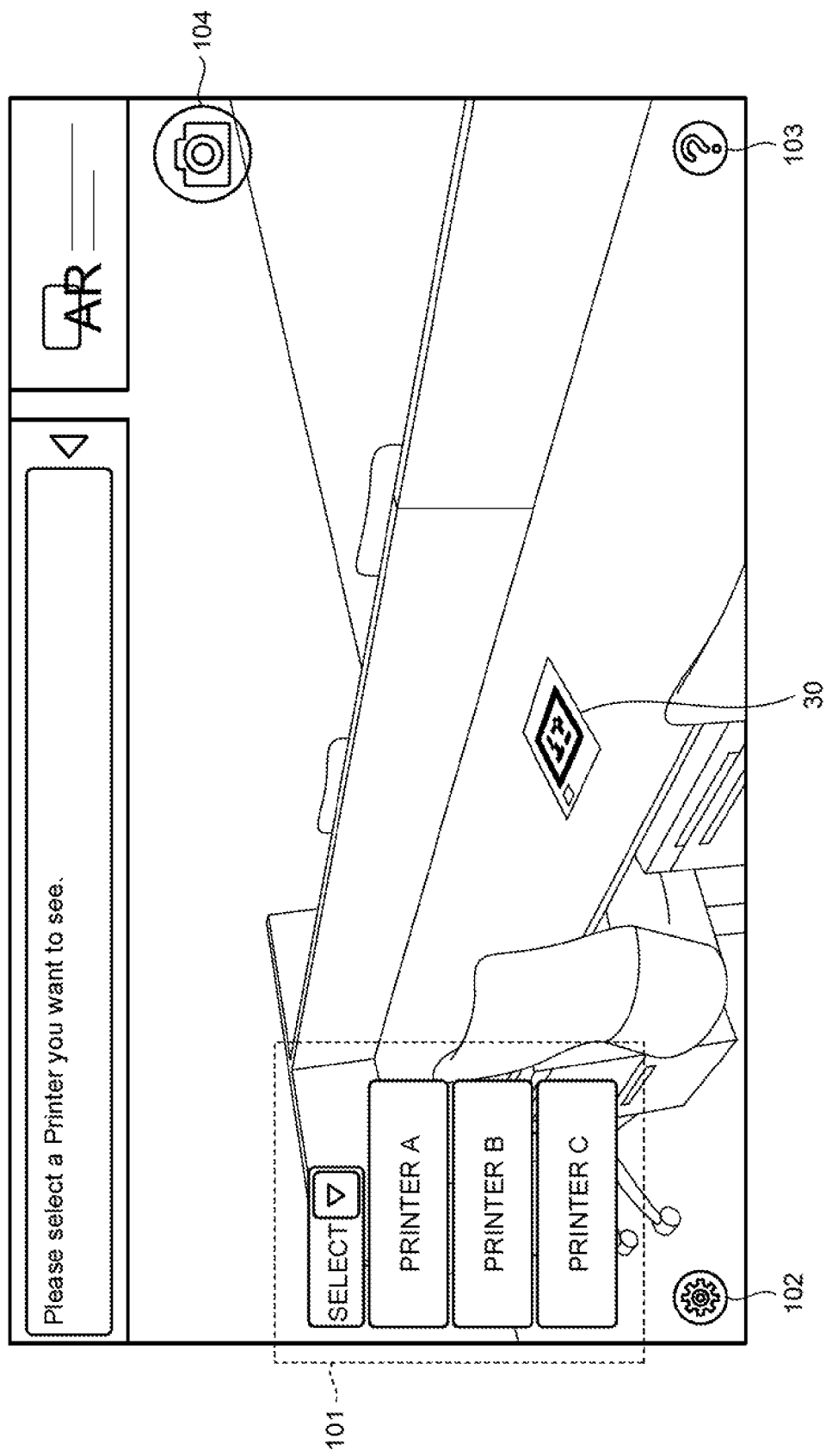
FIG. 15 is a diagram illustrating another example of the model selection screen (where the list is displayed) according to the first embodiment.

FIG. 15 is a diagram illustrating another example of the model selection screen (where a list is displayed) according to the first embodiment. The example of FIG. 15 illustrates a case in which pressing the model selection button 101 has displayed Printer A, Printer B, and Printer C as the list. The operation receiver 15 receives an operation of selecting a model name from the list, and then, the generator 16 generates the composite image in which an image representing the virtual object 40 associated with the model name is combined, at the location of the AR marker 30, with the captured image. Then, the display controller 13 displays, on the display unit 14, a screen obtained by adding user interface (UI) components (such as various buttons [refer to FIG. 16]) (to be described later) to the composite image. Selecting, for example, Printer A displays the virtual object 40 represented by Main unit image A of the initial display image information (refer to FIG. 5) included in the display setting information, at the location of the AR marker 30.

At this time, the display controller 13 and the generator 16 use an AR technology to change the appearance of the virtual object 40 according to a positional relation between the imaging unit 12 of the information processing apparatus 10 and the AR marker 30. Specifically, the display controller 13 first detects the AR marker 30 included in the captured image, and determines whether the appearance (at least either of the position in the captured image and the shape) of the AR marker 30 has changed. If the appearance of the AR marker 30 has changed, the generator 16 changes the display state of the virtual object 40 (for example, enlargement, contraction, movement, and/or rotation) according to the degree of the change in appearance, and thus generates the composite image in which the virtual object 40 is combined with the captured image. Then, the display controller 13 displays, on the display unit 14, the screen obtained by adding the UI components (such as the various buttons [refer to FIG. 16]) (to be described later) to the composite image. This operation allows the user of the information processing apparatus 10 to refer to the virtual object 40 from various directions by directing the imaging unit 12 toward directions in which the user wants to refer to the three-dimensionally displayed virtual object 40 while referring to the virtual object 40 three-dimensionally displayed on the display unit 14.

FIG. 16 is a diagram illustrating an example of a model display screen (in the case of Printer A) according to the first embodiment. The model display screen of the first embodiment includes the model selection button 101, the setting button 102, the help button 103, the camera button 104, the model display part 105, operation buttons 106, a bank selection button 107, a finisher selection button 108, an installation limit area specifying button 109, a product specification display button 110, the recommended product display button 111, the product purchase button 112, a map display button 113, and a share button 114.

The description of the model selection button 101, the setting button 102, the help button 103, and the camera button 104 is the same as that made with reference to FIG. 13, and thus, will not be repeated.

The model display part 105 displays a model name selected using the model selection button 101. Functions available for the model are also displayed. Specifically, the display controller 13 obtains the specification information identified by the model name displayed in the model display part 105 from the storage unit 11, and uses the specification information to display the functions available for the model on the display unit 14. The example of FIG. 16 illustrates a case in which copy, print, scan, and facsimile (FAX) functions are available for Printer A.

The operation buttons 106 include an ADF operation button 106a, a toner cover operation button 106b, a paper tray operation button 106c, a duplex unit operation button 106d, and a print operation display button 106e.

The ADF operation button 106a is a button for opening and closing operations of the ADF. Pressing the ADF operation button 106a displays an operation represented by an image file specified by the movable part image information of FIG. 8 (in the case of ADF) included in the display setting information. If no image file is specified by the movable part image information (in the case of ADF), the display controller 13 does not display the ADF operation button 106a, or displays the ADF operation button 106a, for example, at half brightness (in a semi-transparent state).

Pressing the ADF operation button 106a displays the image (animation) representing the operation of opening the ADF. Specifically, if the virtual object 40 corresponds to Printer A, ADF_open image A of the movable part image information (refer to FIG. 8) included in the display setting information is used to display the image (animation) representing the operation of opening the ADF.

FIG. 19 is a diagram illustrating an example of the model display screen of the first embodiment after the ADF operation button 106a is pressed. In this state, pressing again the ADF operation button 106a displays the image (animation) representing the operation of closing the ADF. Specifically, if the virtual object 40 corresponds to Printer A, ADF_close image A of the movable part image information (refer to FIG. 8) included in the display setting information is used to display the image (animation) representing the operation of closing the ADF, and the display of Printer A returns to the state illustrated in FIG. 16.

Referring back to FIG. 16, the toner cover operation button 106b is a button for opening and closing operations of the toner cover. Pressing the toner cover operation button 106b displays an operation represented by an image file specified by the movable part image information of FIG. 9 (in the case of Toner cover) included in the display setting information. If no image file is specified by the movable part image information (in the case of the Toner cover), the display controller 13 does not display the toner cover operation button 106b, or displays the toner cover operation button 106b, for example, at half brightness (in a semi-transparent state).

Pressing the toner cover operation button 106b displays the image (animation) representing the operation of opening the toner cover. Specifically, if the virtual object 40 corresponds to Printer A, Toner_open image A of the movable part image information (refer to FIG. 9) included, in the display setting information is used, to display the image (animation) representing the operation of opening the toner cover.

Figure 17A:
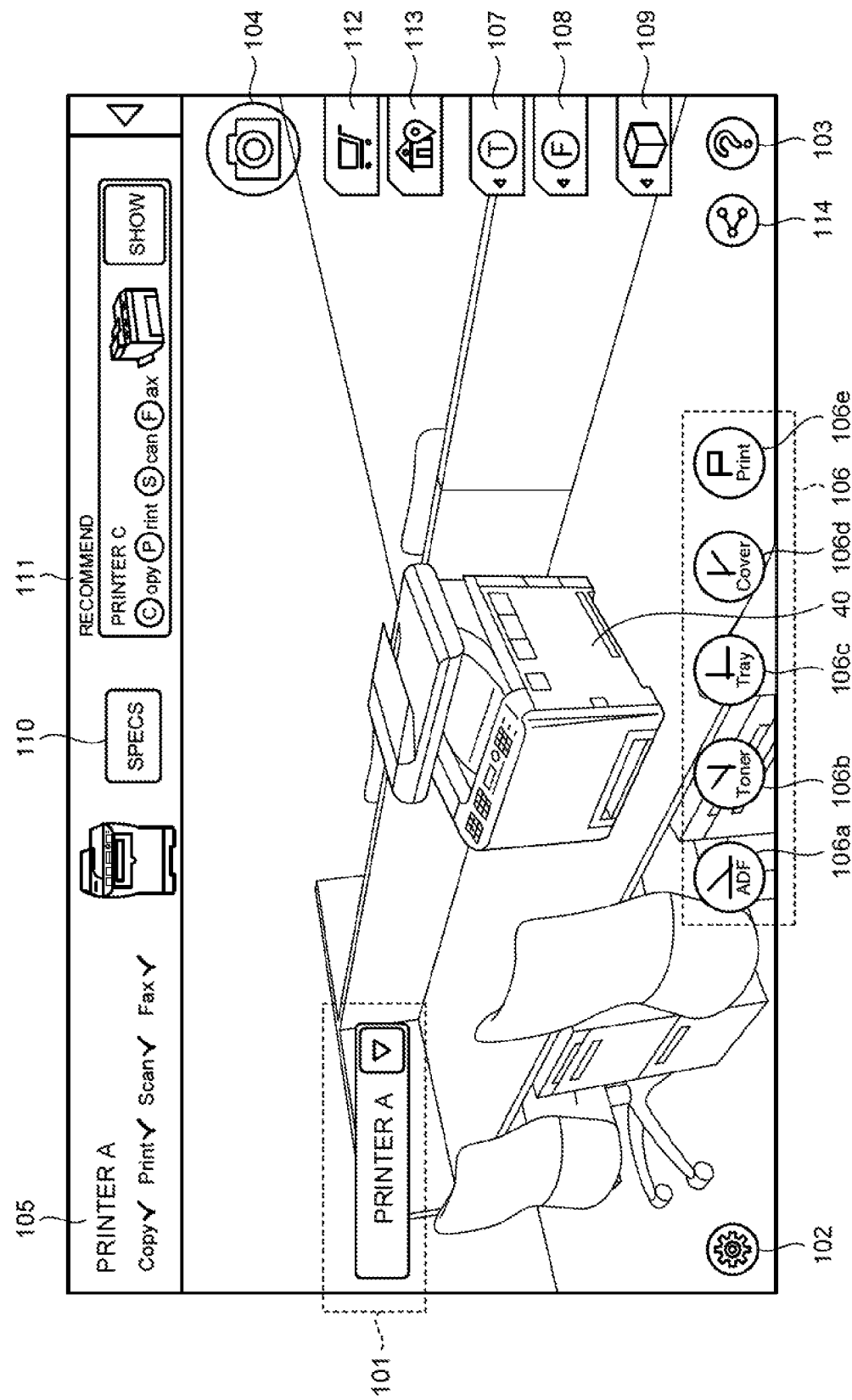
FIG. 17A is a diagram illustrating an example of an animation representing an operation of opening a toner cover according to the first embodiment.
Figure 17C:
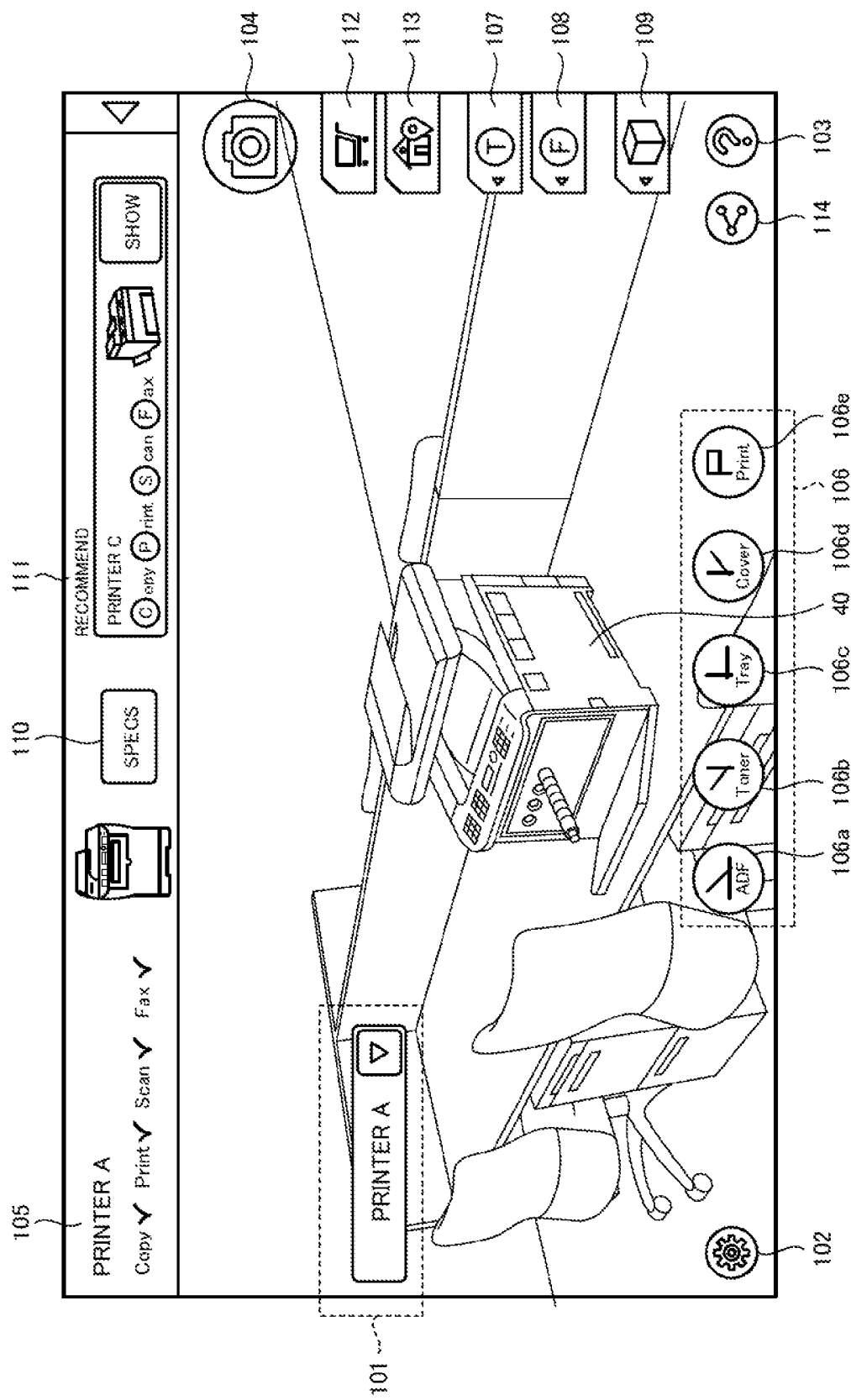
FIG. 17C is a diagram illustrating an example of the animation representing the operation of opening the toner cover according to the first embodiment.

FIGS. 17A to 17C are diagrams illustrating examples of the animation representing the operation of opening the toner cover according to the first embodiment. FIG. 11A illustrates a state before the toner cover operation button 106b is pressed. FIG. 17B illustrates a state in the process of the animation representing the operation of opening the toner cover. FIG. 17C illustrates a state at the end of the animation representing the operation of opening the toner cover.

Pressing the toner cover operation button 106b causes the display controller 13 to start displaying the animation representing the operation of opening the toner cover. The animation representing the operation of opening the toner cover includes an animation representing a state when a toner cartridge is taken out. Viewing and listening to the animation representing the operation of opening the toner cover allows the user to more clearly understand how to take out the toner cartridge.

Referring back to FIG. 16, pressing again the toner cover operation button 106b displays the image (animation) representing the operation of closing the toner cover. Specifically, if the virtual object 40 corresponds to Printer A, Toner_close image A of the movable part image information (refer to FIG. 9) included in the display setting information is used to display the image (animation) representing the operation of closing the toner cover.

Figure 18B:
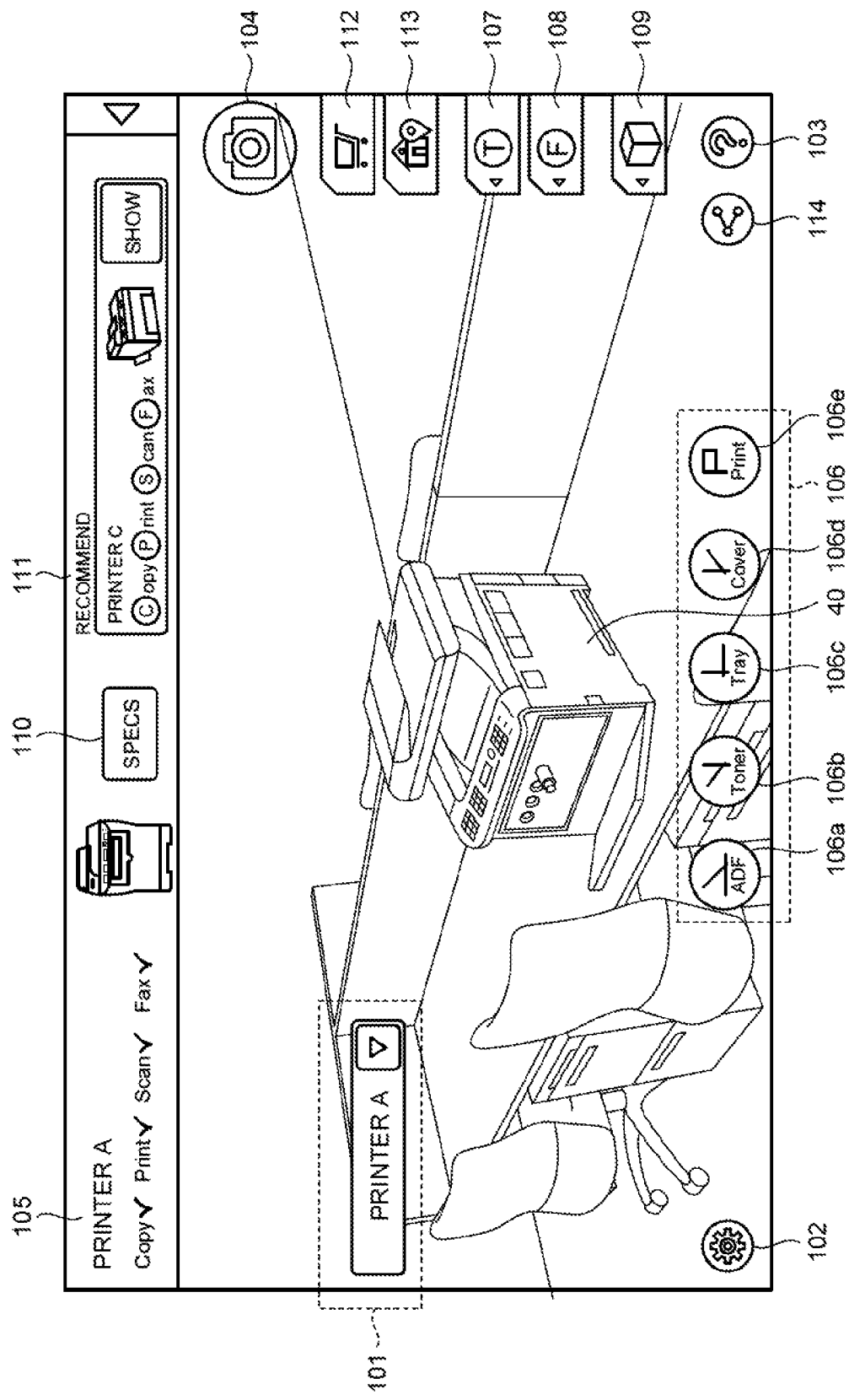
FIG. 18B is a diagram illustrating an example of device animation representing the operation of closing the toner cover according to the first embodiment.

FIGS. 18A to 18C are diagrams illustrating examples of the animation representing the operation of closing the toner cover according to the first embodiment. FIG. 18A illustrates a state when the toner cover operation button 106b is pressed again while the toner cover is open. FIG. 18B illustrates a state in the process of the animation representing the operation of closing the toner cover. FIG. 18C illustrates a state at the end of the animation representing the operation of closing the toner cover.

While the toner cover is open, pressing again the toner cover operation button 106b causes the display controller 13 to start displaying the animation representing the operation of closing the toner cover. The animation representing the operation of closing the toner cover includes an animation representing a state when the toner cartridge is installed. The animation representing the state when the toner cartridge is installed indicates, for example, the direction of rotating the toner cartridge when the toner cartridge is installed. Viewing and listening to the animation representing the operation of closing the toner cover allows the user to more clearly understand how to install the toner cartridge.

The display controller 13 may display animations for opening/closing parts other than the toner cover to indicate how to take out components from inside the opening/closing parts, and how to install the components inside the opening/closing parts. As a result, the user can more clearly understand replacement procedures for components of an object corresponding to the virtual object 40 by viewing and listening to the animations.

The paper tray operation button 106c is a button for opening and closing operations of the paper tray. Pressing the paper tray operation button 106c displays an operation represented by an image file specified by the movable part image information of FIG. 10 (in the case of Paper tray) included in the display setting information. If no image file is specified by the movable part image information (in the case of Paper tray), the display controller 13 does not display the paper tray operation button 106c, or displays the paper tray operation button 106c, for example, at half brightness (in a semi-transparent state).

Pressing the paper tray operation button 106c displays the image (animation) representing the operation of opening the paper tray. Specifically, if the virtual object 40 corresponds to Printer A, Tray_open image A of the movable part image information (refer to FIG. 10) included in the display setting information is used to display the image (animation) representing the operation of opening the paper tray. Pressing again the paper tray operation button 106c displays the image (animation) representing the operation of closing the paper tray. Specifically, if the virtual object 40 corresponds to Printer A, Tray_close image A of the movable part image information (refer to FIG. 10) included in the display setting information is used to display the image (animation) representing the operation of closing the paper tray.

The duplex unit operation button 106d is a button for opening and closing operations of the duplex unit. Pressing the duplex unit operation button 106d displays an operation represented by an image file specified by the movable part image information of FIG. 11 (in the case of Duplex unit) included in the display setting information. If no image file is specified by the movable part image information (in the case of Duplex unit), the display controller 13 does not display the duplex unit operation button 106d, or displays the duplex unit operation button 106d, for example, at half brightness (in a semi-transparent state).

Pressing the duplex unit operation button 106d displays the image (animation) representing the operation of opening the duplex unit. Specifically, if the virtual object 40 corresponds to Printer A, Cover_open image A of the movable part image information (refer to FIG. 11) included in the display setting information is used to display the image (animation) representing the operation of opening the duplex unit. Pressing again the duplex unit operation button 106d displays the image (animation) representing the operation of closing the duplex unit. Specifically, if the virtual object 40 corresponds to Printer A, Cover_close image A of the movable part image information (refer to FIG. 11) included in the display setting information is used to display the image (animation) representing the operation of closing the duplex unit.

The print operation display button 106e is a button for using an animation to display the state of ejecting the printed material from the printer when the printing has been performed. Pressing the print operation display button 106e displays an operation represented by an image file specified by the device operation image information of FIG. 12 (in the case of Print operation) included in the display setting information. If no image file is specified by the device operation image information (in the case of Print operation), the display controller 13 does not display the print operation display button 106e, or displays the print operation display button 106e, for example, at half brightness (in a semi-transparent state).

Pressing the print operation display button 106e causes the display controller 13 to display an animation corresponding to a print speed of the printer so as to give the user a sense of the print speed of the printer. If, for example, the print speed of the printer is 30 pages per minute (ppm), the display controller 13 displays the animation representing a state in which the printer ejects the printed material at a rate of one sheet per two seconds. If, for example, the print speed of the printer is 20 pages per minute (ppm), the display controller 13 displays an animation representing a state in which the printer ejects the printed material at a rate of one sheet per three seconds.

The bank selection button 107 is a button for displaying a bank selection screen. The bank selection screen is a screen for selecting a bank installable in the model displayed in the model display part 105.

FIG. 20A is a diagram illustrating an example of the bank selection screen according to the first embodiment. The display controller 13 displays, on the display unit 14, the bank selection screen based on the detachable part image information (refer to FIG. 6) included in the display setting information for the model displayed in the model display part 105. Specifically, if a plurality of types of banks are available for the model displayed in the model display part 105, the display controller 13 displays a screen for selecting the type of a bank, by displaying a plurality of images representing the banks. If the model displayed in the model display part 105 can contain a plurality of banks, the display controller 13 displays a screen allowing the user to select up to the maximum number of banks indicated in the detachable part image information of FIG. 6.

In the case of the detachable part image information included in the display setting information for Printer A (refer to FIG. 6), the number of types of banks is one, so that the maximum number of banks is one. Hence, FIG. 20A displays one front view of Bank image A.

FIG. 20B is a diagram illustrating an example of the model display screen of the first embodiment after the bank is selected. After the operation receiver 15 receives an operation indicating a selection of the bank on the bank selection screen of FIG. 20A, a virtual detachable object 43 representing the bank is added to the virtual object 40 representing the main unit of Printer A, as illustrated in FIG. 20B. Specifically, the generator 16 further combines Bank image A with the composite image obtained by combining Main unit image A with the captured image, and the display controller 13 displays the resultant composite image on the display unit 14. This operation allows the user to more clearly imagine the case in which the detachable part (optional part) is installed on the main unit of Printer A.

Referring back to FIG. 16, the finisher selection button 108 is a button for displaying a finisher selection screen. The description of the finisher selection screen is similar to that of the bank selection screen, and thus, will be omitted.

The installation limit area specifying button 109 is a button for displaying an installation limit area specifying screen. The installation limit area specifying screen is a screen for specifying an installation limit area that indicates limits of an area in which an object corresponding to the virtual object 40 is to be installed.

FIG. 21 is a diagram illustrating an example of the installation limit area specifying screen according to the first embodiment. In addition to the display of the screen of FIG. 16, the installation limit area specifying screen of the first embodiment further includes a frame 120, width specifying buttons 121, depth specifying buttons 122, height specifying buttons 123, and frame moving buttons 124.

The frame 120 indicates the size of the installation limit area. The width, the depth, the height, and the display position of the frame 120 are changed according to operations of the width specifying buttons 121, the depth specifying buttons 122, the height specifying buttons 123, and the frame moving buttons 124.

Specifically, pressing the "+" button of the width specifying buttons 121 increases the width of the frame 120, and pressing the "-" button of the width specifying buttons 121 reduces the width of the frame 120. In the same manner, pressing the "+" button of the depth specifying buttons 122 increases the depth of the frame 120, and pressing the "-" button of the depth specifying buttons 122 reduces the depth of the frame 120. Also, in the same manner, pressing the "+" button of the height specifying buttons 123 increases the height of the frame 120, and pressing the "-" button of the height specifying buttons 123 reduces the height of the frame 120.

Any user interface may be used for specifying the width, the depth, and the height of the frame 120. For example, the display controller 13 may display a number input section with an arrangement of numeric keys on the display unit 14, and the operation receiver 15 may receive input of numbers representing the width, the depth, and the height.

Pressing any one of the frame moving buttons 124 moves the frame 120 up, down, right, or left in the background image (captured image) on the installation limit area specifying screen depending on the pressed direction button.

If the installation limit area represented by the frame 120 cannot accommodate the virtual object 40, the display controller 13 changes the display state of the frame 120 representing the installation limit area. The display state may be changed by any method. Examples of the method for changing the display state include a method of changing the color of the lines representing the frame 120, a method of changing the thickness of the lines representing the frame 120, and a method of blinking the lines representing the frame 120.

For example, in the case of the example of FIG. 21, the frame 120 can accommodate the virtual object 40 representing Printer A with the closed ADF, so that the display controller 13 displays the frame 120 in yellow. The frame 120 cannot accommodate the virtual object 40 representing Printer A with the open ADF, so that the display controller 13 displays the frame 120 in red. This method allows the user to more clearly have an imagination as to whether any given installation location represented by the frame 120 can accommodate Printer A when a movable part of Printer A is operated.

Referring back to FIG. 16, the product specification display button 110 is a button for displaying a product specification screen that displays the specification information identified by the model name displayed in the model display part 105.

FIG. 22 is a diagram illustrating an example of the product specification screen according to the first embodiment. After the operation receiver 15 receives an operation indicating a press of the product specification display button 110,. the display controller 13 obtains the specification information for the model displayed in the model display part 105 from the storage unit 11, and displays the product specification screen containing the specification information, on the display unit 14. The specification information includes, for example, the maximum print size, the dimensions of the printer, the supported operating systems (OSs), the print speeds, the resolutions, and the supported interfaces.

The display controller 13 also displays, on the product specification screen, detailed specification links for displaying web pages that display detailed specifications. After the operation receiver 15 receives an operation indicating a press of one of the detailed specification links, the communication unit 17 accesses the address indicated by the pressed detailed specification link, and the display controller 13 displays the website at the accessed address, on the display unit 14.

Referring back to FIG. 16, the recommended product display button 111 is a button for displaying the model display screen for a model recommended to the user. The model recommended to the user is, for example, a model similar in product specifications to the model displayed in the model display part 105. After the operation receiver 15 receives an operation indicating a press of the recommended product display button 111, the generator 16 generates a composite image in which the main unit image in the initial display image information included in the display setting information for the model recommended to the user is combined, at the location of the AR marker 30, with the captured image. The display controller 13 displays the model display screen corresponding to the composite image, on the display unit 14.

The product purchase button 112 is a button for displaying a website where the model displayed in the model display part 105 can be purchased. After the operation receiver 15 receives an operation indicating a press of the product purchase button 112, the communication unit 17 obtains, from the storage unit 11, the address of the website where the model displayed in the model display part 105 can be purchased. The display controller 13 displays the website at the address accessed by the communication unit 17, on the display unit 14.

The map display button 113 is a button for displaying a map display screen that indicates locations of stores where the model displayed in the model display part 105 can be purchased.

Figure 23:
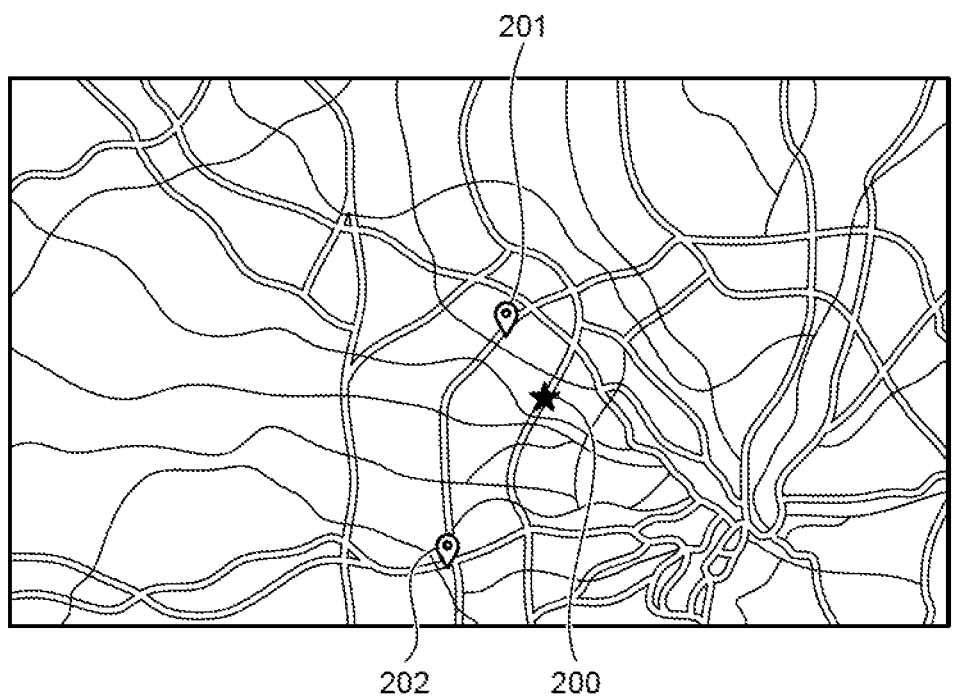
FIG. 23 is a diagram illustrating an example of a map display screen according to the first embodiment.

FIG. 23 is a diagram illustrating an example of the map display screen according to the first embodiment. After the operation receiver 15 receives an operation indicating a press of the map display button 113, the GPS unit 18 obtains a current location 200 of the information processing apparatus 10. The display controller 13 displays a map of the vicinity of the current location 200 on the display unit 14, and clearly indicates the locations of the stores where the model displayed in the model display part 105 can be purchased, on the map display screen, if the stores are located in the vicinity of the current location 200. The example of FIG. 23 illustrates a case in which locations of stores 201 and 202 are clearly indicated on the map display screen.

Referring back to FIG. 16, pressing the share button 114 pops up a list of sharing applications on, for example, Facebook (registered trademark) and Twitter (registered trademark). After the operation receiver 15 receives an operation indicating a selection of one of the sharing applications, the user can share with other users, for example, information displayed on the display unit 14, using the selected sharing application.

The following describes an example of a method for information processing according to the first embodiment.

Figure 24:
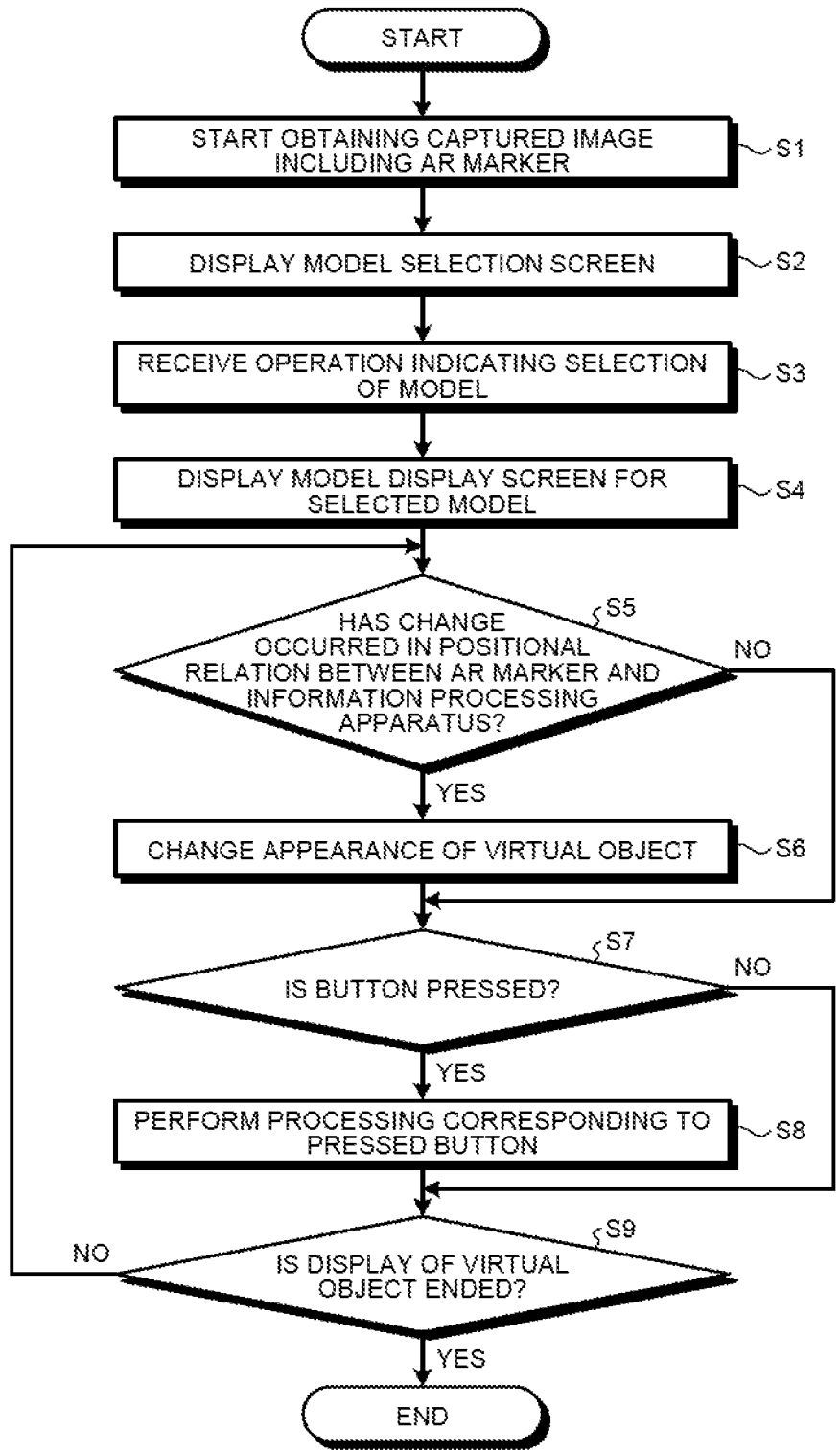
FIG. 24 is a flowchart illustrating an example of a method for information processing according to the first embodiment.

FIG. 24 is a flowchart illustrating the example of the method for information processing according to the first embodiment. First, the imaging unit 12 starts capturing the image including the AR marker 30 indicating the position to display the virtual object 40 (Step S1).

Then, the display controller 13 receives the captured image from the imaging unit 12, and then, displays, on the display unit 14, the model selection screen with the captured image used as the background of the screen (refer to FIG. 13) (Step S2). Then, the operation receiver 15 receives the operation of selecting the model name from the drop-down list of the model selection button 101 (Step S3).

Then, the display controller 13 displays, on the display unit 14, the model display screen for the model identified by the model name selected at Step S3 (refer to FIG. 16) (Step S4). Specifically, the generator 16 first generates the composite image in which the image representing the virtual object 40 associated with the model name selected at Step S3 is combined, at the location of the AR marker 30, with the captured image. The display controller 13 displays, on the display unit 14, the screen obtained by adding the UI components, such as the various buttons, to the composite image.

Then, the display controller 13 determines whether any change has occurred in the positional relation between the imaging unit 12 of the information processing apparatus 10 and the AR marker 30 (Step S5). Specifically, the display controller 13 detects the AR marker 30 included in the captured image, and, based on whether the appearance (at least either of the position in the captured image and the shape) of the AR marker 30 has changed, determines whether any change has occurred in the positional relation between the imaging unit 12 of the information processing apparatus 10 and the AR marker 30.

If the positional relation between the imaging unit 12 and the AR marker 30 has changed (Yes at Step S5), the display controller 13 uses the AR technology to change the appearance of the virtual object 40 according to the changed positional relation (Step S6). If the positional relation between the imaging unit 12 and the AR marker 30 has not changed (No at Step S5), the process proceeds to Step S7.

Then, the operation receiver 15 determines whether a button on the model display screen (refer to FIG. 16) is pressed (Step S7). If the button is pressed (Yes at Step S7), the information processing apparatus 10 performs processing corresponding to the button among the various buttons described above (Step S8). If the button is not pressed (No at Step 37), the process proceeds to Step S9.

Then, the operation receiver 15 determines whether an operation is received to end the processing for displaying the virtual object 40 (Step S3). If not (No at Step S9), the process returns to Step S5. If the operation to end the processing is received (Yes at Step S9), the process ends.

The following describes an example of a hardware configuration of the information processing apparatus 10 according to the first embodiment.

Figures 25, 26:
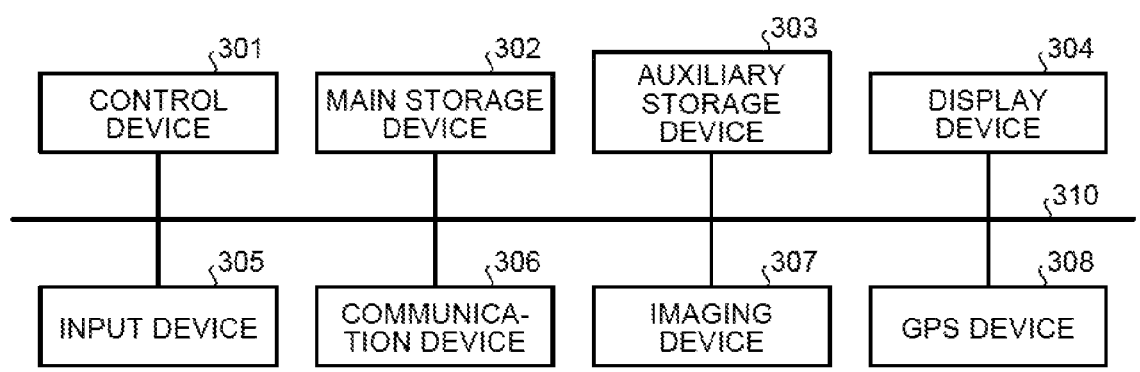
FIG. 25 is a diagram illustrating an example of device hardware configuration of the information processing apparatus according to the first embodiment.
FIG. 26 is a diagram illustrating an example of the initial display image information (in the case of Refrigerator) according to a second embodiment of the present invention.

FIG. 25 is a diagram illustrating the example of the hardware configuration of the information processing apparatus 10 according to the first embodiment. The information processing apparatus 10 of the first embodiment includes a control device 301, a main storage device 302, an auxiliary storage device 303, a display device 304, an input device 305, a communication device 306, an imaging device 307, and a GPS device 308. The control device 301, the main storage device 302, the auxiliary storage device 303, the display device 304, the input device 305, the communication device 306, the imaging device 307, and the GPS device 308 are connected to one another through a bus 310.

The control device 301 executes a computer program read from the auxiliary storage device 303 to the main storage device 302. The main storage device 302 is configured by memories, such as a read-only memory (ROM) and a random access memory (RAM). The auxiliary storage device 303 is, for example, a memory card. The storage unit 11 of FIG. 4 corresponds to the main storage device 302 and the auxiliary storage device 303.

The display device 304 and the input device 305 are configured as a liquid-crystal touch panel having a display function and an input function. The communication device 306 communicates with another device. The imaging device 307 captures an image representing a state around the information processing apparatus 10. The GPS device 308 receives signals from a plurality of GPS satellites so as to obtain GPS information indicating the location of the information processing apparatus 10.

The program to be executed by the information processing apparatus 10 is stored as a file or files in an installable format or an executable format in a non-transitory computer-readable recording medium, such as a compact disc read only memory (CD-ROM), a memory card, a compact disc recordable (CD-R), or a digital versatile disc (DVD), and is provided as a computer program product.

The program to be executed by the information processing apparatus 10 may be configured to be stored in a computer connected to a network, such as the Internet, and provided by being downloaded through the network.

Alternatively, the program to be executed by the information processing apparatus 10 may be configured to be provided through the network, such as the Internet, without being downloaded.

The program for the information processing apparatus 10 may be configured to be provided by being incorporated in advance into, for example, a ROM.

The program executed by the information processing apparatus 10 has a modular configuration that includes, among the functional blocks described above, functional blocks implementable by the program. Examples of the functional blocks implementable by the program include the display controller 13, the operation receiver 15, the generator 16, and the communication unit 17. As actual hardware, the control device 301 reads the program from a storage medium, such as the auxiliary storage device 303, and executes the program to load the functional blocks implemented by the program into the main storage device 302. In other words, the functional blocks implemented by the program are generated in the main storage device 302.

One, some, or all of the functional blocks implementable by the program may be implemented by hardware, such as an integrated circuit (IC), without being implemented by the program.

As described above, in the information processing apparatus 10 of the first embodiment, the imaging unit 12 obtains the captured image including the AR marker 30 (position identification information) for identifying the position to display the virtual object 40. The generator 16 generates the composite image obtained by combining the virtual object 40 at the location identified by the AR marker 30 included in the captured image. When the operation receiver 15 has received an operation on a movable part of the virtual object 40, the display of the movable part is changed according to the display setting information for displaying the virtual object 40. This operation allows the user to more clearly imagine the case in which the movable part of the object is operated.

Second Embodiment

The following describes a second embodiment of the present invention. In the second embodiment, a case will be described in which the object corresponding to the virtual object 40 is a home electric appliance. While the second embodiment will be described by exemplifying a case of a refrigerator, the home electric appliance is not limited to the refrigerator, but may be any home electric appliance. In the second embodiment, the same description as that of the first embodiment will not be repeated, and points different from the first embodiment will be described.

The information processing system 1 of the second embodiment has the same configuration as that of the information processing system 1 of the first embodiment (refer to FIG. 1). The information processing apparatus 10 of the second embodiment has the same configuration as that of the information processing apparatus 10 of the first embodiment (refer to FIG. 4).

First, the following describes the display setting information (initial display image information and movable part image information) of the second embodiment.

FIG. 26 is a diagram illustrating an example of the initial display image information (in the case of Refrigerator) according to the second embodiment. The initial display image information indicates a state when the virtual object 40 representing the refrigerator starts to be displayed. The initial display image information includes the following items: Model name and Main unit image. Model name represents the name of the model of the refrigerator. In the second embodiment, Model name serves as the identification information for identifying the type of the virtual object 40. Main unit represents specifying information for specifying an image representing the refrigerator. The specifying information is, for example, an image file name. The main unit image is displayed at the location of the AR marker 30 included in the captured image taken by the information processing apparatus 10.

For example, in the example of FIG. 26, if the information processing apparatus 10 initially displays the virtual object 40 corresponding to Refrigerator Ra, the virtual object 40 based on Main unit image Ra is displayed.

The following describes an example of the movable part image information according to the second embodiment.

FIG. 27 is a diagram illustrating the example of the movable part image information (in the case of Door) according to the second embodiment. The movable part image information of FIG. 27 includes the following items: Model name, Door number, Door (open), Door (close), and Display reference point. Model name represents the name of the model of the refrigerator. Door number is a number for identifying a door of the refrigerator. Door (open) represents specifying information for specifying an image (animation) representing an operation of opening a door. Door (close) represents specifying information for specifying an image (animation) representing an operation of closing the door. The specifying information is, for example, an image file name. Display reference point represents a position to display the image (animation) representing the operation of opening the door and the image (animation) representing the operation of closing the door.

For example, in the example of Refrigerator Ra of FIG. 27, Door_open image Ra1 serves as an image (animation) representing the operation of opening a door of Refrigerator Ra in a row where Door number is 1, and Door_close image Ra1 serves as an image (animation) representing the operation of closing the door of Refrigerator Ra in the row where Door number is 1. The position to display Door_open image Ra1 and Door close image Ra1 is specified by coordinates (x_a1, y_ra1, z_ra1) of the display reference point.

The following describes examples of the model selection screen according to the second embodiment.

FIG. 28 is a diagram illustrating an example of the model selection screen according to the second embodiment. The model selection screen of the second embodiment includes the model selection button 101, the setting button 102, the help button 103, and the camera button 104.

The model selection button 101 is a drop-down list button for selecting a model of the refrigerator. Pressing the model selection button 101 of the operation receiver 15 causes the display controller 13 to display, on the display unit 14, a list of model names of refrigerators stored as the above-described display setting information in the storage unit 11.

The setting button 102 is the button for displaying the setting screen for changing the display settings, such as the display language (such as Japanese, English, or Chinese) and the character size.

The help button 103 is the button for displaying the help screen for presenting the operating instructions.

The camera button 104 is the button for capturing an image to be displayed as the background. While the virtual object 40 representing the refrigerator is displayed at the location of the AR marker 30, pressing the camera button 104 of the operation receiver 15 stores a composite image including the virtual object 40 representing the refrigerator in, for example, the storage unit 11.

FIG. 29 is a diagram illustrating another example of the model selection screen (where the list is displayed) according to the second embodiment. The example of FIG. 29 illustrates a case in which pressing the model selection button 101 has displayed Refrigerator Ra, Refrigerator Rb, and Refrigerator Rc as the list. The operation receiver 15 receives an operation of selecting a model name from the list, and then, the generator 16 generates the composite image in which an image representing the virtual object 40 associated with the model name is combined, at the location of the AR marker 30, with the captured image. Then, the display controller 13 displays, on the display unit 14, a screen obtained by adding UI components (such as various buttons [refer to FIG. 30]) (to be described later) to the composite image. Selecting, for example, Refrigerator Ra displays the virtual object 40 represented by Main unit image Ra of the initial display image information (refer to FIG. 26) included in the display setting information, at the location of the AR marker 30.

FIG. 30 is a diagram illustrating an example of the model display screen (in the case of Refrigerator Ra) according to the second embodiment. The model display screen of the second embodiment includes the model selection button 101, the setting button 102, the help button 103, the camera button 104, the model display part 105, the operation buttons 106, the installation limit area specifying button 109, the product specification display button 110, the recommended product display button 111, the product purchase button 112, the map display button 113, and the share button 114.

The description of the model selection button 101, the setting button 102, the help button 103, and the camera button 104 is the same as that made with reference to FIG. 13, and thus, will not be repeated.

The model display part 105 displays a model name selected using the model selection button 101. FIG. 30 exemplifies a display of Refrigerator Ra.

The operation buttons 106 include a first-door operation button 106*f*, a second-door operation button 106*g*, and a third-door operation button 106*h*.

The first-door operation button 106*f* is a button for opening and closing operations of a door 51. The first-door operation button 106*f* displays operations represented by image files specified by information in a row where Door number is 1 in the movable part image information of FIG. 27 (in the case of Door) included in the display setting information.

Pressing the first-door operation button 106*f* displays an image {animation} representing an operation of opening the door 51. Specifically, if the virtual object 40 corresponds to Refrigerator Ra, Door_open image Ra1 of the movable part image information (refer to FIG. 27) included in the display setting information is used to display the image (animation) representing the operation of opening the door 51.

FIG. 31 is a diagram illustrating an example of the model display screen of the second embodiment after the first-door operation button 106*f* is pressed. In this state, pressing again the first-door operation button 106*f* displays an image (animation) representing an operation of closing the door 51. Specifically, if the virtual object 40 corresponds to Refrigerator Ra, Door_close image Ra1 of the movable part image information (refer to FIG. 27) included in the display setting information is used to display the image (animation) representing the operation of closing the door 51, and the display of Refrigerator Ra returns to the state illustrated in FIG. 30.

Referring back to FIG. 30, the second-door operation button 106*g* is a button for opening and closing operations of a door 52. The second-door operation button 106*g* displays operations represented by image files specified by information in a row where Door number is 2 in the movable part image information of FIG. 27 (in the case of Door) included in the display setting information.

The third-door operation button 106*h* is a button for opening and closing operations of a door 53. The third-door operation button 106*h* displays operations represented by image files specified by information in a row where Door number is 3 in the movable part image information of FIG. 27 (in the case of Door) included in the display setting information.

The installation limit area specifying button 109 is a button for displaying an installation limit area specifying screen. The installation limit area specifying screen is a screen for specifying an installation limit area that indicates limits of an area in which an object corresponding to the virtual object 40 is to be installed. The installation limit area specifying screen of the second embodiment is the same as the installation limit area specifying screen of the first embodiment (refer to FIG. 21), and thus will not be described.

The product specification display button 110 is a button for displaying a product specification screen that displays the specification information identified by the model name displayed in the model display part 105. The product specification screen of the second embodiment is the same as the product specification screen of the first embodiment (refer to FIG. 22), and thus will not be described.

The recommended product display button 111 is a button for displaying the model display screen for a model recommended to the user. The model recommended to the user is, for example, a model similar in product, specifications to the model displayed in the model display part 105. After the operation receiver 15 receives an operation indicating a press of the recommended product display button 111, the generator 16 generates a composite image in which the main unit image in the initial display image information included in the display setting information for the model recommended to the user is combined, at the location of the AR marker 30, with the captured image. The display controller 13 displays the model display screen corresponding to the composite image, on the display unit 14.

The product purchase button 112 is a button for displaying a website where the model displayed in the model display part 105 can be purchased. After the operation receiver 15 receives an operation indicating a press of the product purchase button 112, the communication unit 17 obtains, from the storage unit 11, the address of the website where the model displayed in the model display part 105 can be purchased. The display controller 13 displays the website at the address accessed by the communication unit 17, on the display unit 14.

Pressing the map display button 113 displays a map display screen that indicates locations of stores where the model displayed in the model display part 105 can be purchased. The map display screen of the second embodiment is the same as the map display screen of the first embodiment (refer to FIG. 23), and thus will not be described.

Pressing the share button 114 pops up the list of sharing applications on, for example, Facebook (registered trademark) and Twitter (registered trademark). After the operation receiver 15 receives an operation indicating a selection of one of the sharing applications, the user can share with other users, for example, information displayed on the display unit 14, using the selected sharing application.

The method for information processing of the second embodiment is the same as the method for information processing of the first embodiment (refer to FIG. 24), and thus will not be described. The hardware configuration of the information processing apparatus 10 of the second embodiment is the same as the hardware configuration of the information processing apparatus 10 of the first embodiment (refer to FIG. 25), and thus will not be described.

As described above, in the information processing apparatus 10 of the second embodiment, when the operation receiver 15 has received an operation on a movable part of the virtual object 40 representing the refrigerator, the display of the movable part is changed according to the display setting information for displaying the virtual object 40 representing the refrigerator. As a result, in the case in which the object is the refrigerator (home electric appliance), the user can more clearly imagine the case in which the movable part of the refrigerator (home electric appliance) is operated, in the same manner as in the first embodiment.

Third Embodiment

The following describes a third embodiment of the present invention. The third embodiment will be described by exemplifying a case in which the object corresponding to the virtual object 40 is a vehicle. While the third embodiment will be described by exemplifying a case of an automobile, the vehicle is not limited to the automobile, but may be any vehicle. In the third embodiment, the same description as that of the first embodiment will not be repeated, and points different from the first embodiment will be described.

The information processing system 1 of the third embodiment has the same configuration as that of the information processing system 1 of the first embodiment (refer to FIG. 1). The information processing apparatus 10 of the third embodiment has the same configuration as that of the information processing apparatus 10 of the first embodiment (refer to FIG. 4).

First, the following describes the display setting information (initial display image information and movable part image information) of the third embodiment.

FIG. 32 is a diagram illustrating an example of the initial display image information (in the case of Automobile) according to the third embodiment. The initial display image information indicates a state when the virtual object 40 representing the automobile starts to be displayed. The initial display image information includes the following items: Vehicle model name and Vehicle body image. Vehicle model name represents a name of a vehicle model of the automobile. In the third embodiment, Vehicle model name serves as the identification information for identifying the type of the virtual object 40. Vehicle body represents specifying information for specifying an image representing the automobile. The specifying information is, for example, an image file name. The vehicle body image is displayed at the location of the AR marker 30 included in the captured image taken by the information processing apparatus 10.

For example, in the example of FIG. 32, if the information processing apparatus 10 initially displays the virtual object 40 corresponding to Automobile Ca, the virtual object 40 based on Vehicle body image Ca is displayed.

The following describes an example of the movable part image information according to the third embodiment.

FIG. 33 is a diagram illustrating an example of the movable part image information (in the case of Opening/closing part of automobile) according to the third embodiment. The movable part image information of FIG. 33 includes the following items: Vehicle model name, Opening/closing part name, Opening/closing part (open), Opening/closing part (close), and Display reference point. Vehicle model name represents the name of the vehicle model of the automobile. Opening/closing part name represents a name of an opening/closing part of the automobile. Opening/closing part (open) represents specifying information for specifying an image (animation) representing an operation of opening the opening/closing part. Opening/closing part (close) represents specifying information for specifying an image (animation) representing an operation of closing the opening/closing part. The specifying information is, for example, an image file name. Display reference point represents a position to display the image (animation) representing the operation of opening the opening/closing part and the image (animation) representing the operation of closing the opening/closing part.

For example, in the example of Automobile Ca of FIG. 33, Open image Ca2 serves as an image (animation) representing the operation of opening the driver's door of Automobile Ca, and Close image Ca2 serves as an image (animation) representing the operation of closing the driver's door of Automobile Ca. The position to display Open image Ca2 and Close image Ca2 is specified by coordinates (x_ca2, y_ca2, z_ca2) of the display reference point.

FIG. 12 is a diagram illustrating an example of device virtual object 40 (in the case of Automobile Ca) according to the third embodiment. The virtual object 40 representing Automobile Ca includes a bonnet 61, a driver's door 62, a front passenger door 63, a right rear passenger door 64, a left rear passenger door 65, and a rear trunk lid 66. For example, pressing an operation button for the driver's door 62 on a vehicle model display screen of Automobile Ca displays an image (animation) representing an operation of opening the driver's door 62, using Open image Ca2 of the movable part image information (refer to FIG. 33) included in the display setting information. The vehicle model display screen for Automobile Ca of the third embodiment is similar to the model display screen of the first embodiment (FIG. 16) and the model display screen of the second embodiment (FIG. 30), and thus will not be described.

Figure 34:
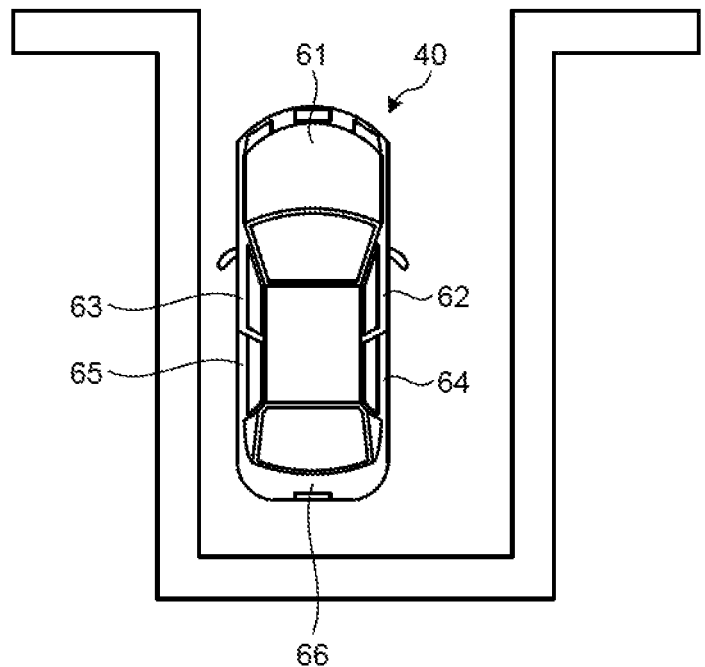
FIG. 34 is a diagram illustrating an example of the virtual object (in the case of Automobile Ca) according to the third embodiment.
Figure 35:
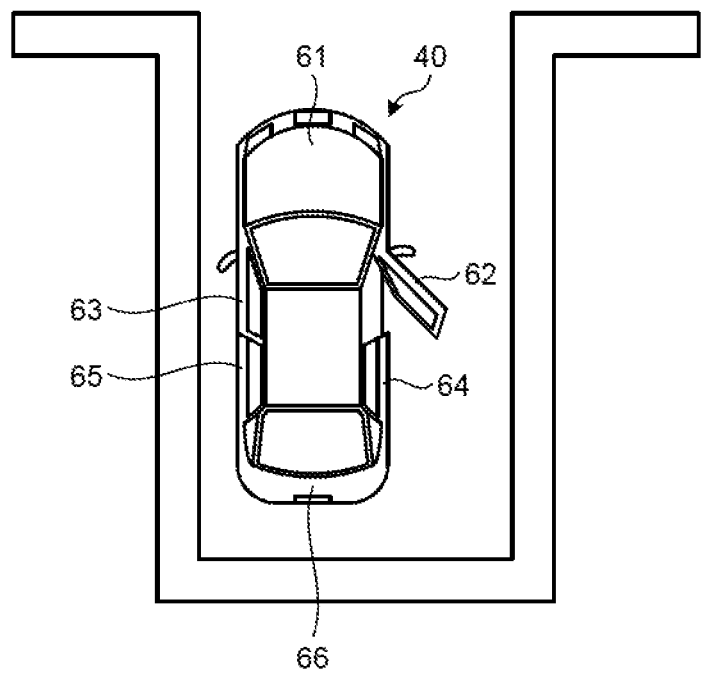
FIG. 35 is a diagram illustrating an example of the virtual object (when the driver's door is open) according to the third embodiment.

FIG. 35 is a diagram illustrating an example of the virtual object 40 (when the driver's door 62 is open) according to the third embodiment. Pressing again the operation button for the driver's door 62 on the vehicle model display screen of Automobile Ca displays an image (animation) representing an operation of closing the driver's door 62, using Close image Ca2 of the movable part image information (refer to FIG. 33) included in the display setting information, and the virtual object 40 returns to the state of FIG. 34.

The method for information processing of the third embodiment is the same as the method for information processing of the first embodiment (refer to FIG. 24), and thus will not be described. The hardware configuration of the information processing apparatus 10 of the third embodiment is the same as the hardware configuration of the information processing apparatus 10 of the first embodiment (refer to FIG. 25), and thus will not be described.

As described above, in the information processing apparatus 10 of the third embodiment, when the operation receiver 15 has received an operation on a movable part of the virtual object 40 representing the automobile, the display of the movable part is changed according to the display setting information for displaying the virtual object 40 representing the automobile. As a result, in the case in which the object is the automobile (vehicle), the user can more clearly imagine the case in which the movable part of the automobile (vehicle) is operated, in the same manner as in the first and second embodiments.

While the first to third embodiments have been described above by exemplifying the cases in which the object corresponding to the virtual object 40 is the printer (office equipment), the refrigerator (home electric appliance), and the automobile (vehicle), the object may be any object. The object corresponding to the virtual object 40 may be, for example, a piece of furniture, such as a chest of drawers.

The embodiments of the present invention provides an advantageous effect of allowing a user to more clearly imagine a case in which a movable part of an object is operated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising circuitry configured to execute steps of:
    obtaining a captured image including position identification information identifying a position in which a virtual object represented by an image including an immovable part and a movable part is to be displayed;
    generating a composite image obtained by combining the virtual object with the captured image in the position thereof identified by the position identification information;
    receiving an operation on the movable part included in the composite image displayed on a display; and
    a controlling the display of the movable part, based on display setting information for displaying the virtual object, when the operation on the movable part has been received; and
    displaying on the display a moving image of a virtual object representing a state in which a printing device corresponding to the virtual object ejects a printed material when printing has been performed, according to a print speed of the printing device corresponding to the virtual object.

2. The information processing apparatus according to claim 1, wherein the information processing apparatus receives the display setting information and stores the display setting information.

3. The information processing apparatus according to claim 1, wherein the information processing apparatus receives an operation of specifying an installation limit area that indicates limits of an area in which an object corresponding to the virtual object is to be installed, and generates the composite image obtained by further combining information representing the installation limit area with the captured image.

4. The information processing apparatus according to claim 3, wherein the information processing apparatus changes a display state of the information representing the installation limit area if the installation limit area is not capable of accommodating the virtual object.

5. The information processing apparatus according to claim 1, wherein the information processing apparatus receives an operation indicating a selection of a virtual detachable object that is attachable to and detachable from the virtual object, and generates the composite image obtained by combining the virtual object including the virtual detachable object with the captured image.

6. The information processing apparatus according to claim 1, wherein the information processing apparatus receives an operation of selecting a piece of identification information for the virtual object from a plurality of pieces of identification information for the virtual object, and generates the composite image obtained by combining the virtual object identified by the selected piece of identification information with the captured image, in the position identified by the position identification information included in the captured image.

7. The information processing apparatus according to claim 1, wherein the information processing apparatus generates the composite image obtained by combining, with the captured image, the virtual object a display state of which has been changed by applying at least one of enlargement, contraction, translation, and rotation to the virtual object according to a change in at least either of a position in the captured image and a shape of the position identification information, and displays the composite image obtained by combining the virtual object the display state of which has been changed with the captured image, on the display.

8. The information processing apparatus according to claim 1, wherein the information processing apparatus displays a website on a network from which an object corresponding to the virtual object is available, on the display.

9. The information processing apparatus according to claim 1, wherein the information processing apparatus displays a map indicating a location where an object corresponding to the virtual object is available, on the display.

10. The information processing apparatus according to claim 1, wherein the information processing apparatus displays information on an object corresponding to the virtual object, on the display.

11. The information processing apparatus according to claim 1, wherein the information processing apparatus displays information on a similar object that includes information similar to information on an object corresponding to the virtual object, on the display.

12. The information processing apparatus according to claim 1, wherein the information processing apparatus displays a moving image of the virtual object representing a replacement procedure of a component of an object corresponding to the virtual object, on the display.

13. The information processing apparatus according to claim 1, wherein the information processing apparatus displays a region selection screen to select a region from a plurality of regions, on the display, and performs display control based on region setting information associated with the selected region.

14. A method for information processing conducted by an information processing apparatus, the method comprising:

obtaining a captured image including position identification information identifying a position in which a virtual object represented by an image including an immovable part and a movable part is to be displayed;

generating a composite image obtained by combining the virtual object with the captured image in the position thereof identified by the position identification information;

receiving an operation on the movable part included in the composite image displayed on a display;

controlling the display of the movable part, based on display setting information for displaying the virtual object, when the operation on the movable part has been received; and displaying on the display unit a moving image of a virtual object representing a state in which a printing device corresponding to the virtual object ejects a printed material when printing has been performed, according to a print speed of the printing device corresponding to the virtual object.

15. A program product including a program of instructions stored in a non-transitory computer-readable recording medium and executable by a processor included in an information processing apparatus that comprises the processor and a display unit, the processor being configured by execution of the program of instructions to perform a method comprising:

generating a composite image obtained by combining the virtual object with the captured image in the position thereof identified by the position identification information;

receiving an operation on the movable part included in the composite image displayed on the display unit;

a controlling the display of the movable part, based on display setting information for displaying the virtual object, when the operation on the movable part is received; and displaying on the display a moving image of a virtual object representing a state in which a printing device corresponding to the virtual object ejects a printed material when printing has been performed, according to a print speed of the printing device corresponding to the virtual object.

* * * * *